(12) United States Patent
Suzuki

(10) Patent No.: US 11,605,223 B2
(45) Date of Patent: *Mar. 14, 2023

(54) METHODS AND APPARATUSES FOR CORNER DETECTION

(71) Applicant: MAGIC LEAP, INC., Plantation, FL (US)

(72) Inventor: Hélder Toshiro Suzuki, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,494

(22) Filed: Jul. 22, 2022

(65) Prior Publication Data

US 2022/0366688 A1   Nov. 17, 2022

Related U.S. Application Data

(63) Continuation of application No. 16/520,119, filed on Jul. 23, 2019, now Pat. No. 11,430,212.

(Continued)

(51) Int. Cl.
*G06V 20/20* (2022.01)
*G06T 7/73* (2017.01)
(Continued)

(52) U.S. Cl.
CPC ......... *G06V 20/20* (2022.01); *G02B 27/0093* (2013.01); *G02B 27/0101* (2013.01);
(Continued)

(58) Field of Classification Search
None
See application file for complete search history.

(56) References Cited

U.S. PATENT DOCUMENTS 8,666,159 B1 * 3/2014 Ogale .................... G06T 7/174
382/162
8,737,737 B1   5/2014 Feldman et al.
(Continued)

FOREIGN PATENT DOCUMENTS

JP    2014-99087     5/2004
JP    2005-157911    6/2005

OTHER PUBLICATIONS

Harris et al., "A Combined Corner and Edge Detector", Plessey Research Roke Manor, United Kingdom © The Plessey Company pic. 1988. (Year: 1988).*

(Continued)

*Primary Examiner* — Saptarshi Mazumder
(74) *Attorney, Agent, or Firm* — Vista IP Law Group, LLP

(57) ABSTRACT

An apparatus configured for head-worn by a user, includes: a screen configured to present graphics for the user; a camera system configured to view an environment in which the user is located; and a processing unit coupled to the camera system, the processing unit configured to: obtain a first image with a first resolution, the first image having a first corner, determine a second image with a second resolution, the second image having a second corner that corresponds with the first corner in the first image, wherein the second image is based on the first image, the second resolution being less than the first resolution, detect the second corner in the second image, determine a position of the second corner in the second image, and determine a position of the first corner in the first image based at least in part on the determined position of the second corner in the second image.

20 Claims, 13 Drawing Sheets

Related U.S. Application Data

(60) Provisional application No. 62/702,477, filed on Jul. 24, 2018.

(51) Int. Cl.
　　*G06F 16/58*　　　(2019.01)
　　*H04W 4/021*　　　(2018.01)
　　*H04W 4/029*　　　(2018.01)
　　*G02B 27/01*　　　(2006.01)
　　*G02B 27/00*　　　(2006.01)
　　*G06T 19/00*　　　(2011.01)
　　*G06V 10/44*　　　(2022.01)
　　*G06V 10/75*　　　(2022.01)

(52) U.S. Cl.
　　CPC ............ *G06F 16/5866* (2019.01); *G06T 7/73* (2017.01); *G06T 19/006* (2013.01); *G06V 10/44* (2022.01); *G06V 10/758* (2022.01); *H04W 4/021* (2013.01); *H04W 4/029* (2018.02); *G02B 2027/0147* (2013.01)

(56) References Cited

U.S. PATENT DOCUMENTS

| | | | |
|---|---|---|---|
| 9,305,362 | B1 | 4/2016 | Szedo et al. |
| 10,043,076 | B1 | 8/2018 | Zhang et al. |
| 2004/0104935 | A1 | 6/2004 | Williamson et al. |
| 2012/0154562 | A1* | 6/2012 | Munzenmayer ....... G06V 10/44 348/E7.085 |
| 2013/0148897 | A1 | 6/2013 | Takacs et al. |
| 2014/0193076 | A1 | 7/2014 | Gardiner et al. |
| 2015/0205126 | A1 | 7/2015 | Schowengerdt |
| 2016/0165134 | A1 | 6/2016 | Lelescu et al. |
| 2018/0137651 | A1* | 5/2018 | Levinshtein ............. G06T 9/20 |

OTHER PUBLICATIONS

Final Office Action for U.S. Appl. No. 16/520,119 dated Feb. 14, 2022.

Final Office Action for U.S. Appl. No. 16/520,119 dated Apr. 12, 2021.

Non-Final Office Action for U.S. Appl. No. 16/520,119 dated Sep. 3, 2021.

Non-Final Office Action for U.S. Appl. No. 16/520,119 dated Nov. 9, 2020.

Amendment Response to NFOA for U.S. Appl. No. 16/520,119 dated Dec. 1, 2021.

Amendment Response to NFOA for U.S. Appl. No. 16/520,119 dated Feb. 9, 2021.

Amendment Response to FOA for U.S. Appl. No. 16/520,119 dated Apr. 13, 2022.

Notice of Allowance for U.S. Appl. No. 16/520,119 dated Apr. 25, 2022.

PCT International Search Report and Written Opinion for International Appln. No. PCT/US19/43070, Applicant Magic Leap, Inc., dated Oct. 22, 2019 (19 pages).

Harris et al., an article entitled "A Combined Corner and Edge Detector", (1988). [Retrieved from Online on Sep. 20, 2019 (Sep. 20, 2019)]; [Retrieved from URL: http://citeseerx.ist.psu.edu/viewdoc/download?doi=10.1.1.434.4816&rep=rep1&type=pdf]; entire document.

PCT International Preliminary Report on Patentability for International Appln. No. PCT/US2019/043070, Applicant Magic Leap, Inc., dated Jan. 26, 2021 (17 pages).

Extended European Search Report for EP Patent Appln. No. 19840933.6 dated Aug. 18, 2021.

Foreign response for EP Patent Appln. No. 19840933.6 dated Mar. 17, 2022.

\* cited by examiner

METHODS AND APPARATUSES FOR CORNER DETECTION

RELATED APPLICATION DATA

This disclosure is a continuation of pending U.S. patent application Ser. No. 16/520,119, filed Jul. 23, 2019 and entitled "METHODS AND APPARATUSES FOR CORNER DETECTION,", which claims priority to U.S. Provisional Patent Application No. 62/702,477, filed Jul. 24, 2018 and entitled "METHODS AND APPARATUSES FOR CORNER DETECTION,". The entire contents of the aforementioned patent applications are hereby explicitly incorporated by reference into the present disclosure for all purposes as though set forth in full.

FIELD

The present disclosure relates to head-worn image display devices, and methods and apparatus for detecting corners in images generated by head-worn image display devices.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems may generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenario in a user's mind.

Various optical systems generate images, including color images, at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems may employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated (e.g., "warped") to take the change in head pose (i.e., the orientation and/or location of user's head) into account.

As an example, if a user wearing a head-worn display device views a virtual representation of a virtual object on the display and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion.

Head-worn display devices that enable AR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that it does not correspond to real physical objects located in respective positions in space. Instead, virtual content only exist in the brains (e.g., the optical centers) of a user of the head-worn display device when stimulated by light beams directed to the eyes of the user.

In some cases, a head-worn image display device may display virtual objects with respect to a real environment, and/or may allow a user to place and/or manipulate virtual objects with respect to the real environment. In such cases, the image display device may be configured to localize the user with respect to the real environment, so that virtual objects may be correctly displaced with respect to the real environment. Localization map may be used by head-worn image display device to perform localization. In particular, when performing localization, the image display device may obtain a real-time input image from camera system of the image display device, and match features in the input image with features of the localization map.

Methods and apparatuses for detecting corners in images are described herein. The detected corners may be utilized as features for creating localization maps. Alternatively, the corners may be detected as features from input images for matching with features of localization map for localization of a user.

SUMMARY

An apparatus configured for head-worn by a user, includes: a screen configured to present graphics for the user; a camera system configured to view an environment in which the user is located; and a processing unit coupled to the camera system, the processing unit configured to: obtain a first image with a first resolution, the first image having a first corner, determine a second image with a second resolution, the second image having a second corner that corresponds with the first corner in the first image, wherein the second image is based on the first image, the second resolution being less than the first resolution, detect the second corner in the second image, determine a position of the second corner in the second image, and determine a position of the first corner in the first image based at least in part on the determined position of the second corner in the second image.

Optionally, the processing unit is configured to detect a set of corners in the second image, the set of corners having the second corner.

Optionally, the processing unit is configured to detect a set of corners in the second image based on a Harris corner detection technique.

Optionally, the processing unit is configured to detect the set of corners in the second image based on one or more criteria.

Optionally, the one or more criteria comprises a first criterion for excluding one or more objects in the second image that is planar and/or that has insufficient texture.

Optionally, the one or more criteria comprises a second criterion for excluding one or more objects in the second image that is has a linear configuration.

Optionally, the processing unit is also configured to perform non-maxima suppression to eliminate duplicate detected corners in the set of corners.

Optionally, the non-maxima suppression comprises a 3×3 non-maxima suppression.

Optionally, the processing unit comprises hardware and software; wherein the hardware of the processing unit is configured to detect the set of corners; and wherein the software of the processing unit is configured to perform the non-maxima suppression.

Optionally, the processing unit is configured to perform spatial binning to select a subset of corners from the set of corners.

Optionally, the processing unit is configured to perform spatial binning by: dividing the second image into a plurality of image portions having a first image portion; determining a score for each of the corners in the set of corners; and selecting one or more corners from the corners in the first image portion based on the scores of the corners in the first image portion, and based on a prescribed maximum number of corners for the first image portion.

Optionally, the processing unit comprises hardware and software; wherein the hardware of the processing unit is configured to detect the set of corners; and wherein the software of the processing unit is configured to perform the spatial binning.

Optionally, the processing unit is configured to detect the second corner in the second image by applying a Harris corner detection on the second image.

Optionally, the processing unit is configured to detect the first corner in the first image by applying a Harris corner detection on the first image.

Optionally, the processing unit is configured to detect a set of corners in the first image that includes the first corner.

Optionally, the processing unit is also configured to detect the first corner from the set of corners in the first image based at least in part on the position of the second corner in the second image.

Optionally, the processing unit comprises hardware configured to detect the set of corners in the first image, and software configured to detect the first corner from the set of corners in the first image.

Optionally, the processing unit is configured to determine the position of the first corner based on a relationship between the first resolution of the first image and the second resolution of the second image.

Optionally, the position of the second corner corresponds with a pixel position (xr, yr) in the second image; wherein the pixel position (xr, yr) in the second image corresponds with a plurality of pixel positions in the first image; and wherein the processing unit is configured to determine the position of the first corner by selecting one of the plurality of pixel positions in the first image that has the best spatial relationship with respect to the pixel position (xr, yr) in the second image.

Optionally, the processing unit comprises an image adjuster configured to determine the second image by converting the first image to the second image.

Optionally, the image adjuster is configured to downscale the first resolution of the first image to obtain the second image with the second resolution.

Optionally, the processing unit comprises hardware configured to detect a set of corners in the second image that includes the second corner, and software configured to determine the position of the first corner in the first image.

Optionally, the processing unit comprises hardware.

Optionally, the hardware of the processing unit is configured to detect the second corner in the second image.

Optionally, the hardware of the processing unit is configured to execute a Harris corner detection algorithm.

Optionally, the processing unit comprises a corner detector configured to operate based on a first criterion.

Optionally, the first criterion excludes an object in the second image that is planar and/or that has insufficient texture.

Optionally, the first criterion comprises: $\lambda_{min}$>a threshold, wherein $\lambda_{min}$=min($\lambda_2$, $\lambda_1$), and wherein $\lambda_1$ is a first eigenvalue, $\lambda_2$ Is a second eigenvalue that is larger than the first eigenvalue.

Optionally, the corner detector is configured to operate based also on a second criterion.

Optionally, the second criterion excludes an object with a linear configuration in the second image.

Optionally, the second criterion comprises: $\lambda_2/\lambda_1$<a threshold, wherein $\lambda_1$ is a first eigenvalue, $\lambda_2$ Is a second eigenvalue that is larger than the first eigenvalue.

Optionally, the processing unit is configured to detect the second corner in the second image based on a first constant k1.

Optionally, k1=R/(1+R)^2, where R is any number.

Optionally, the first constant k1 is between 0.1 and 0.2.

Optionally, the first constant k1 is 0.139.

Optionally, the processing unit is configured to detect the second corner in the second image based on a second constant k2.

Optionally, the second constant k2 is less than 0.01.

Optionally, the second constant k2 is 0.00478125.

Optionally, the second constant k2 is based on the first constant k1.

Optionally, k2=(k1−1/16)/16.

Optionally, the processing unit is configured to detect the second corner in the second image based on Det(H), wherein H is a matrix.

Optionally, the processing unit is configured to detect the second corner in the second image based on trace(H), wherein H is a matrix.

Optionally, the processing unit is configured to perform a first Harris corner detection based on a first constant and a second constant, wherein the second constant is different from the first constant.

Optionally, the second constant is based on the first constant.

Optionally, the processing unit is configured to perform non-maxima suppression.

Optionally, the processing unit is configured to perform spatial binning.

Optionally, the processing unit comprises software.

Optionally, the software of the processing unit is configured to perform non-maxima suppression.

Optionally, the software of the processing unit is configured to perform spatial binning.

Optionally, the first resolution comprises a VGA resolution.

Optionally, the second resolution comprises a QVGA resolution.

Optionally, the apparatus further includes a non-transitory medium configured to store the position of the first corner in the first image.

Optionally, the processing unit is configured to create a map based at least in part on the position of the first corner.

Optionally, the map comprises a map point associated with the position of the first corner.

Optionally, the processing unit is configured to perform localization of the user based on the created map.

Optionally, the processing unit is configured to perform a matching between the first image and a map based at least in part on the position of the first corner in the first image.

A method performed by a head-worn image display device, includes: obtaining a first image with a first resolution, the first image having a first corner; determining a second image with a second resolution, the second image having a second corner that corresponds with the first corner in the first image, wherein the second image is based on the first image, the second resolution being less than the first resolution; detecting the second corner in the second image; determining a position of the second corner in the second image; and determining a position of the first corner in the first image based at least in part on the determined position of the second corner in the second image.

Optionally, the second corner is a part of a set of corners in the second image that are detected.

Optionally, the set of corners in the second image is detected based on a Harris corner detection technique.

Optionally, the set of corners in the second image is detected based on one or more criteria.

Optionally, the one or more criteria comprises a first criterion for excluding one or more objects in the second image that is planar and/or that has insufficient texture.

Optionally, the one or more criteria comprises a second criterion for excluding one or more objects in the second image that is has a linear configuration.

Optionally, the method further includes performing non-maxima suppression to eliminate duplicate detected corners in the set of corners.

Optionally, the non-maxima suppression comprises a 3×3 non-maxima suppression.

Optionally, the method is performed by a processing unit comprising hardware and software; wherein the set of corners is detected by the hardware of the processing unit; and wherein the non-maxima suppression is performed by the software of the processing unit.

Optionally, the method further includes performing spatial binning to select a subset of corners from the set of corners.

Optionally, the method further includes performing spatial binning by: dividing the second image into a plurality of image portions having a first image portion; determining a score for each of the corners in the set of corners; and selecting one or more corners from the corners in the first image portion based on the scores of the corners in the first image portion, and based on a prescribed maximum number of corners for the first image portion.

Optionally, the method is performed by a processing unit comprising hardware and software; wherein the set of corners is detected by the hardware of the processing unit; and wherein the spatial binning is performed by the software of the processing unit.

Optionally, the second corner in the second image is detected by applying a Harris corner detection on the second image.

Optionally, the method further includes detecting the first corner in the first image by applying a Harris corner detection on the first image.

Optionally, the method further includes detecting a set of corners in the first image that includes the first corner.

Optionally, the method further includes identifying the first corner from the set of corners in the first image based at least in part on the position of the second corner in the second image.

Optionally, the set of corners in the first image is detected by hardware, and the first corner is identified from the set of corners in the first image by software.

Optionally, the position of the first corner is determined based on a relationship between the first resolution of the first image and the second resolution of the second image.

Optionally, the position of the second corner corresponds with a pixel position (xr, yr) in the second image; wherein the pixel position (xr, yr) in the second image corresponds with a plurality of pixel positions in the first image; and wherein the position of the first corner is determined by selecting one of the plurality of pixel positions in the first image that has the best spatial relationship with respect to the pixel position (xr, yr) in the second image.

Optionally, the second image is determined by converting the first image to the second image.

Optionally, the first image is converted to the second image by downscaling the first resolution of the first image to obtain the second image with the second resolution.

Optionally, the second corner is a part of a set of corners in the second image that are detected, and wherein the position of the first corner in the first image is determined by software.

Optionally, the method is performed by a processing unit that comprises hardware.

Optionally, the second corner in the second image is detected by the hardware of the processing unit.

Optionally, the hardware of the processing unit is configured to execute a Harris corner detection algorithm.

Optionally, the method is performed by a processing unit comprising a corner detector, the corner detector configured to operate based on a first criterion.

Optionally, the first criterion excludes an object in the second image that is planar and/or that has insufficient texture.

Optionally, the first criterion comprises: $\lambda_{min} >$ a threshold, wherein $\lambda_{min} = \min(\lambda_2, \lambda_1)$, and wherein $\lambda_1$ is a first eigenvalue, $\lambda_2$ Is a second eigenvalue that is larger than the first eigenvalue.

Optionally, the corner detector is configured to operate based also on a second criterion.

Optionally, the second criterion excludes an object with a linear configuration in the second image.

Optionally, the second criterion comprises: $\lambda_2/\lambda_1 <$ a threshold, wherein $\lambda_1$ is a first eigenvalue, $\lambda_2$ Is a second eigenvalue that is larger than the first eigenvalue.

Optionally, the second corner in the second image is detected based on a first constant k1.

Optionally, $k1 = R/(1+R)^2$, where R is any number.

Optionally, the first constant k1 is between 0.1 and 0.2.

Optionally, the first constant k1 is 0.139.

Optionally, the second corner in the second image is detected based on a second constant k2.

Optionally, the second constant k2 is less than 0.01.

Optionally, the second constant k2 is 0.00478125.

Optionally, the second constant k2 is based on the first constant k1.

Optionally, $k2 = (k1 - 1/16)/16$.

Optionally, the second corner in the second image is detected based on Det(H), wherein H is a matrix.

Optionally, the second corner in the second image is detected based on trace(H), wherein H is a matrix.

Optionally, the second corner is detected by performing a first Harris corner detection based on a first constant and a second constant, wherein the second constant is different from the first constant.

Optionally, the second constant is based on the first constant.

Optionally, the method further includes performing non-maxima suppression.

Optionally, the method further includes performing spatial binning.

Optionally, the method is performed by a processing unit that comprises software.

Optionally, the method further includes performing non-maxima suppression by the software of the processing unit.

Optionally, the method further includes performing spatial binning by the software of the processing unit.

Optionally, the first resolution comprises a VGA resolution.

Optionally, the second resolution comprises a QVGA resolution.

Optionally, the method further includes storing the position of the first corner in a non-transitory medium.

Optionally, the method further includes creating a map based at least in part on the position of the first corner.

Optionally, the map comprises a map point associated with the position of the first corner.

Optionally, the method further includes performing localization of a user of the image display device based on the created map.

Optionally, the method further includes performing a matching between the first image and a map based at least in part on the position of the first corner in the first image.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Figure 1:
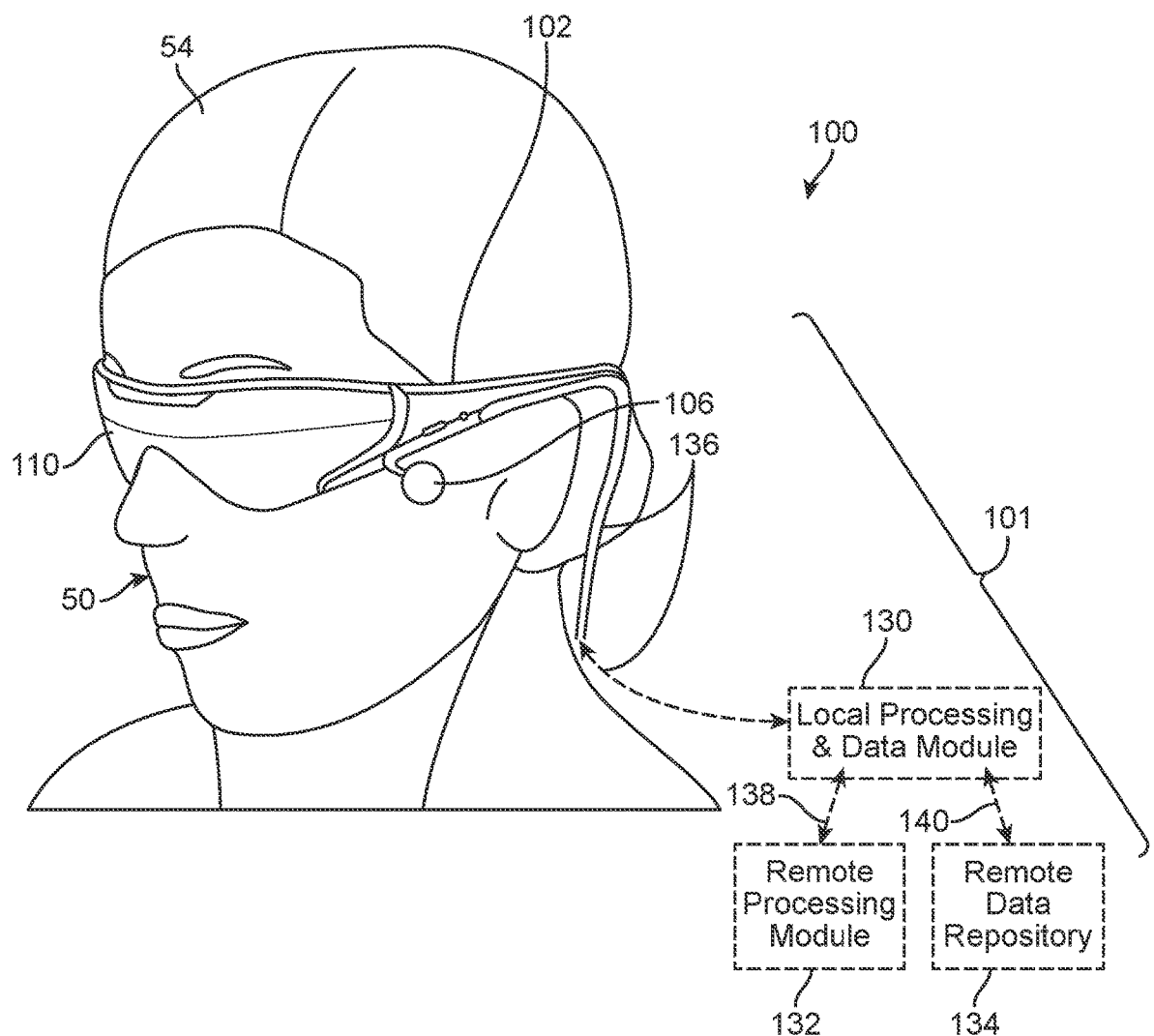
FIG. 1 illustrates another image display system having an image display device in accordance with some embodiments.
Figure 2:
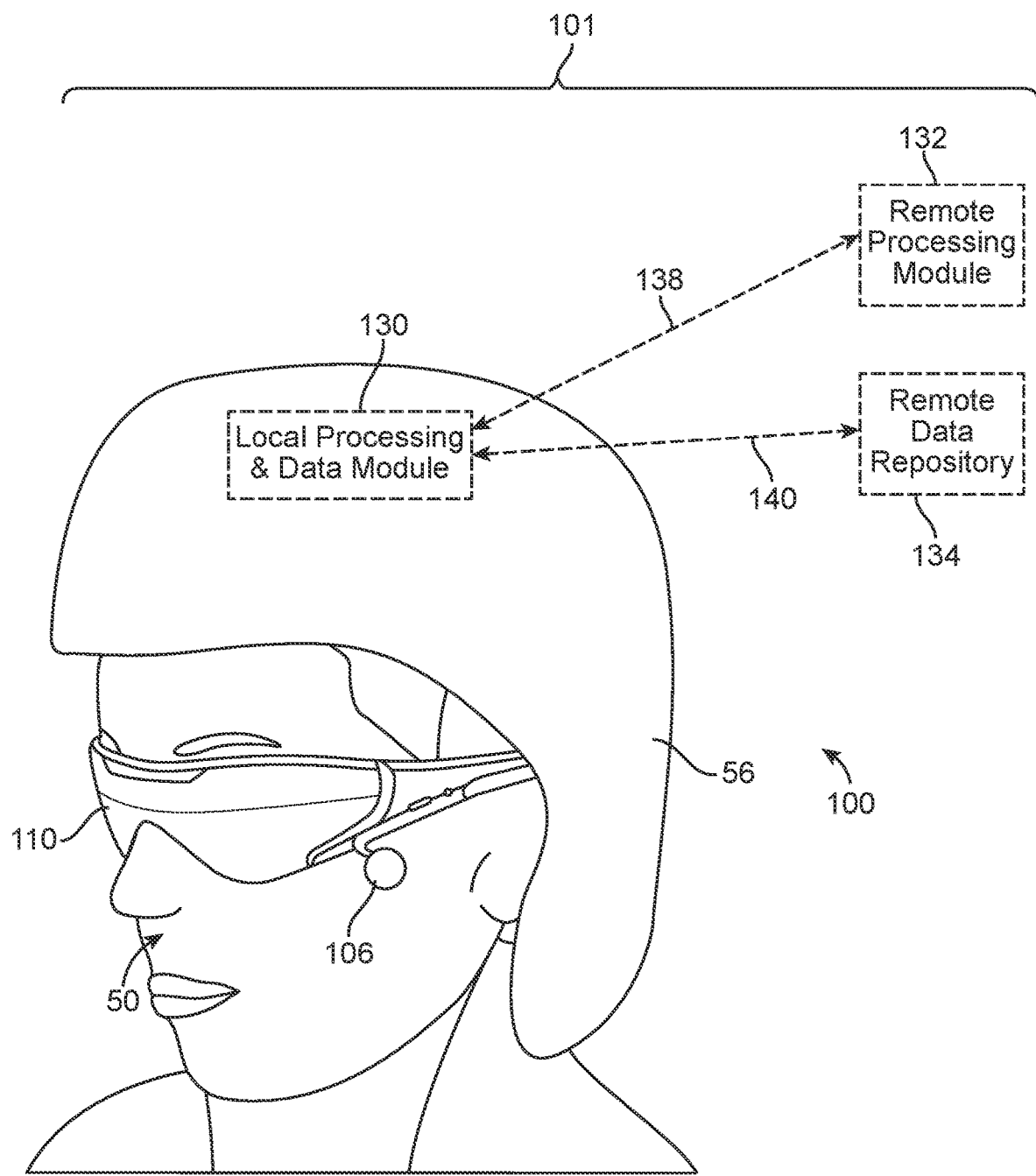
FIG. 2 illustrates another image display system having an image display device in accordance with other embodiments.
Figure 3:
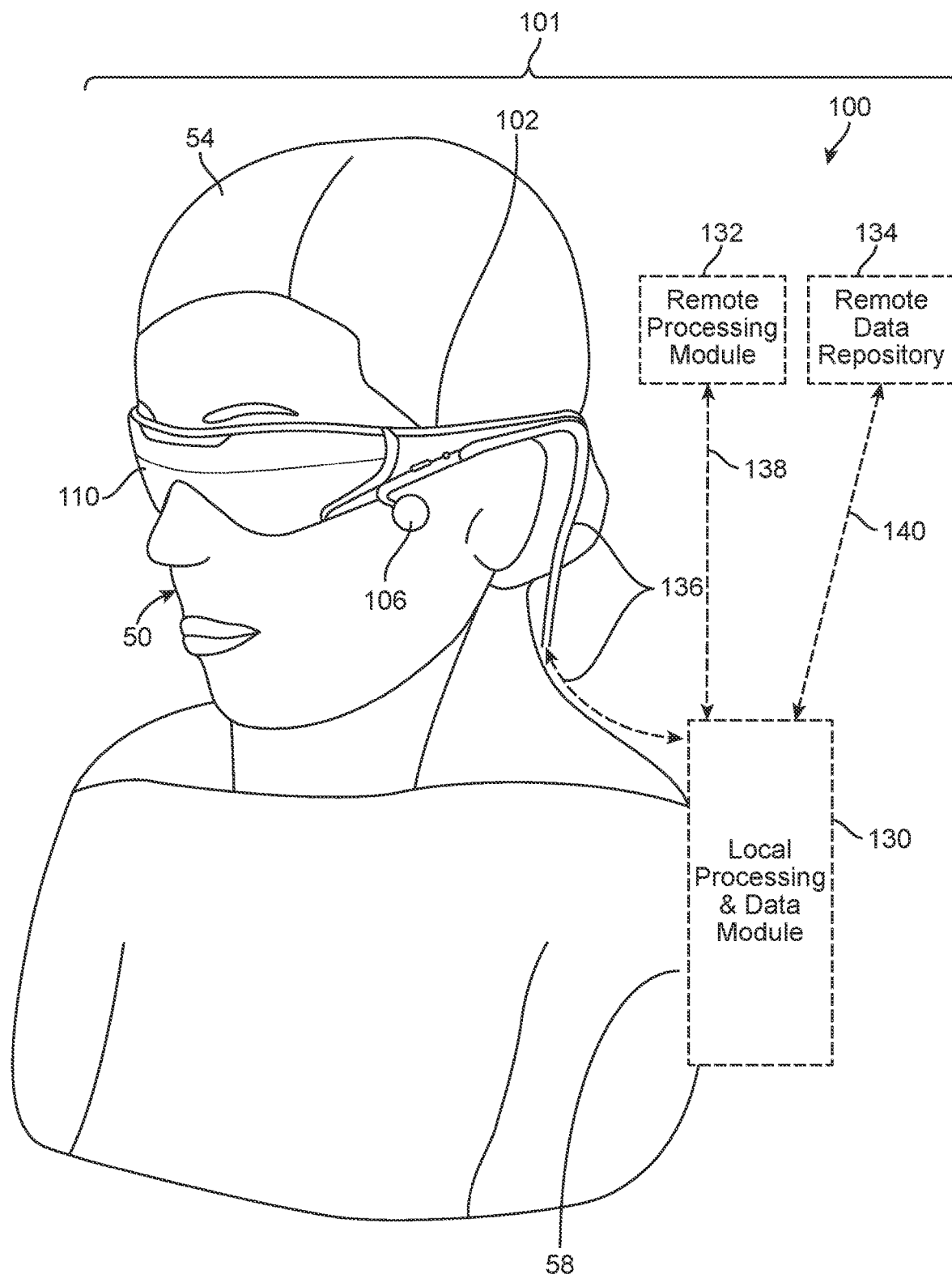
FIG. 3 illustrates another image display system having an image display device in accordance with other embodiments.

Various embodiments of the disclosure are directed to methods, apparatuses, and articles of manufacture for providing input for head-worn video image devices. Other objects, features, and advantages of the disclosure are described in the detailed description, figures, and claims.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The description that follows pertains to an illustrative VR, AR, and/or MR system with which embodiments described herein may be practiced. However, it is to be understood that the embodiments also lends themselves to applications in other types of display systems (including other types of VR, AR, and/or MR systems), and therefore the embodiments are not to be limited to only the illustrative examples disclosed herein.

Summary of Problems and Solutions

In some cases, in order to localize a user of a head-worn image display device with respect to the user's environment, a localization map of the environment is obtained. Then real-time input image from the camera system of the image display device is then matched against the localization map to localize the user. For example corner features of the input image may be detected from the input image, and match against corner features of the localization map. In some embodiments, in order to obtain a set of corners as features from an image for use in localization, the image may first need to go through corner detection to obtain an initial set of detected corners. The initial set of detected corners is then further processed, e.g., go through non-maxima suppression, and spatial binning, etc., in order to obtain a final set of detected corners for localization purposes. However, non-maxima suppression, spatial binning, or other types of processing may require significant computational resources, and may take too long to complete. Accordingly, it would be advantageous to have a novel method and apparatus to obtain a set of corners for localization purposes. In some embodiments, a first image is adjusted to obtain a second image with reduced resolution. The second image is the processed to detect corners, to perform non-maxima suppression, and spatial binning, in order to obtain a set of corners for localization. The set of corners obtained based on the second image with reduced resolution may be refined in positions based on the first image to obtain a final set of corners with improved positions for localization purposes.

FIGS. 1-4 illustrate various components of an image display system 100 in various embodiments. The image display system 100 includes an image display device 101, and an apparatus 200 for providing input for the image display device 101. The apparatus 200 will be described in further detail below. The image display device 101 may be a VR device, an AR device, a MR device, or any of other types of display devices. The image display device 101 includes a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 comprises a partially transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 110 may be monocular or binocular.

The image display device 101 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros), or any combination of the foregoing. Many of these sensors operate on the assumption that the frame 102 on which they are affixed is in turn substantially fixed to the user's head, eyes, and ears.

The image display device 101 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The image display device 101 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of the image display device 101 may include a central processing unit (CPU), a graphics processing unit (GPU), one or more frame buffers, and a three-dimensional data base for storing three-dimensional scene data. The CPU may control overall operation, while the GPU may render frames (i.e., translating a three-dimensional scene into a two-dimensional image) from the three-dimensional data stored in the three-dimensional data base and store these frames in the frame buffers. One or more additional integrated circuits may control the reading into and/or reading out of frames from the frame buffers and operation of the image projection assembly of the display subsystem 110.

Figure 4:
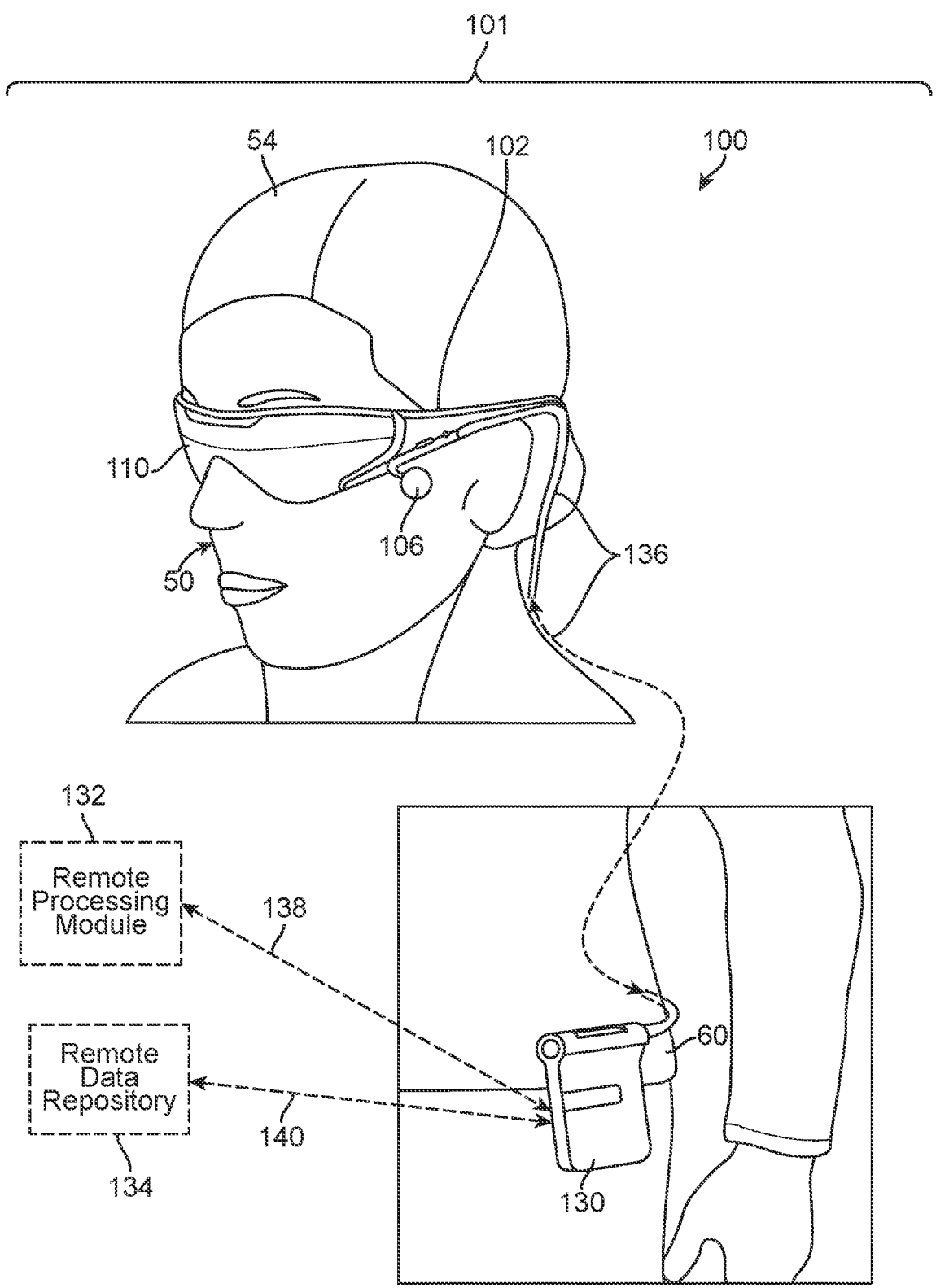
FIG. 4 illustrates another image display system having an image display device in accordance with other embodiments.

The various processing components of the image display device 101 may be physically contained in a distributed subsystem. For example, as illustrated in FIGS. 1-4, the image display device 101 may include a local processing and data module 130 operatively coupled, such as by a wired lead or wireless connectivity 136, to the display subsystem 110 and sensors. The local processing and data module 130 may be mounted in a variety of configurations, such as fixedly attached to the frame structure 102 (FIG. 1), fixedly attached to a helmet or hat 56 (FIG. 2), removably attached to the torso 58 of the end user 50 (FIG. 3), or removably attached to the hip 60 of the end user 50 in a belt-coupling style configuration (FIG. 4). The image display device 101 may also include a remote processing module 132 and remote data repository 134 operatively coupled, such as by a wired lead or wireless connectivity 138, 140, to the local processing and data module 130, such that these remote modules 132, 134 are operatively coupled to each other and available as resources to the local processing and data module 130.

The local processing and data module 130 may comprise a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may comprise one or more relatively powerful processors or controllers configured to analyze and process data and/or image information. The remote data repository 134 may comprise a relatively large-scale digital data storage facility, which may be available through the internet or other networking configuration in a "cloud" resource configuration. In some embodiments, all data is stored and all computation is performed in the local processing and data module 130, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 1-4. Thus, the particular choice of wired or wireless communications should not be considered limiting.

In some embodiments, the user orientation module is contained in the local processing and data module 130, while CPU and GPU are contained in the remote processing module. In alternative embodiments, the CPU, GPU, or portions thereof may be contained in the local processing and data module 130. The 3D database can be associated with the remote data repository 134 or disposed locally.

Some image display systems (e.g., VR system, AR system, MR system, etc.) use a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the image display system 100 (e.g., VR system, AR system, MR system, etc.) projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 5:
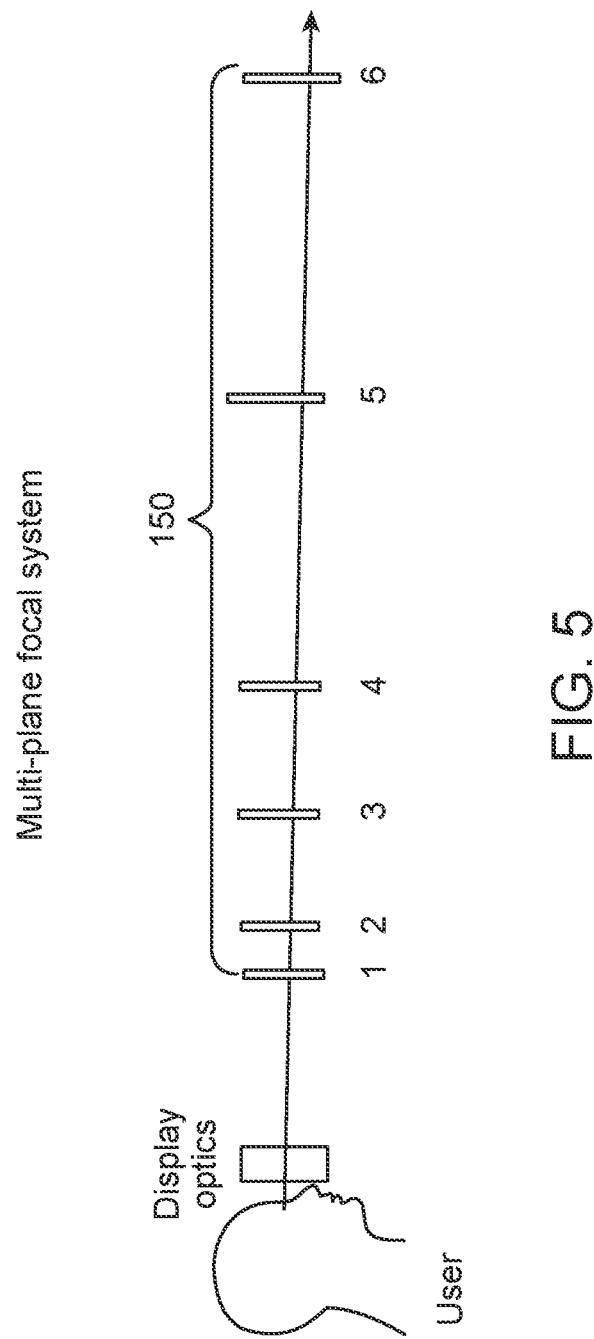
FIG. 5 illustrates an image display device displaying frames in multiple depth planes.

Multiple-plane focus systems create a perception of variable depth by projecting images on some or all of a plurality of depth planes located at respective fixed distances in the Z direction from the user's eye. Referring now to FIG. 5, it should be appreciated that multiple-plane focus systems may display frames at fixed depth planes 150 (e.g., the six depth planes 150 shown in FIG. 5). Although MR systems can include any number of depth planes 150, one exemplary multiple-plane focus system has six fixed depth planes 150 in the Z direction. In generating virtual content one or more of the six depth planes 150, 3-D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 5. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the image display system 100 (e.g., VR system, AR system, MR system, etc.) may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 5) may be utilized. Then an image of a closer tree branch may be injected at time 2 and an LOE configured to create an image appearing to originate from a depth plane 10 meters away (e.g., depth plane 5 from FIG. 5) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

The image display system 100 may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Localization Map

Figure 6:
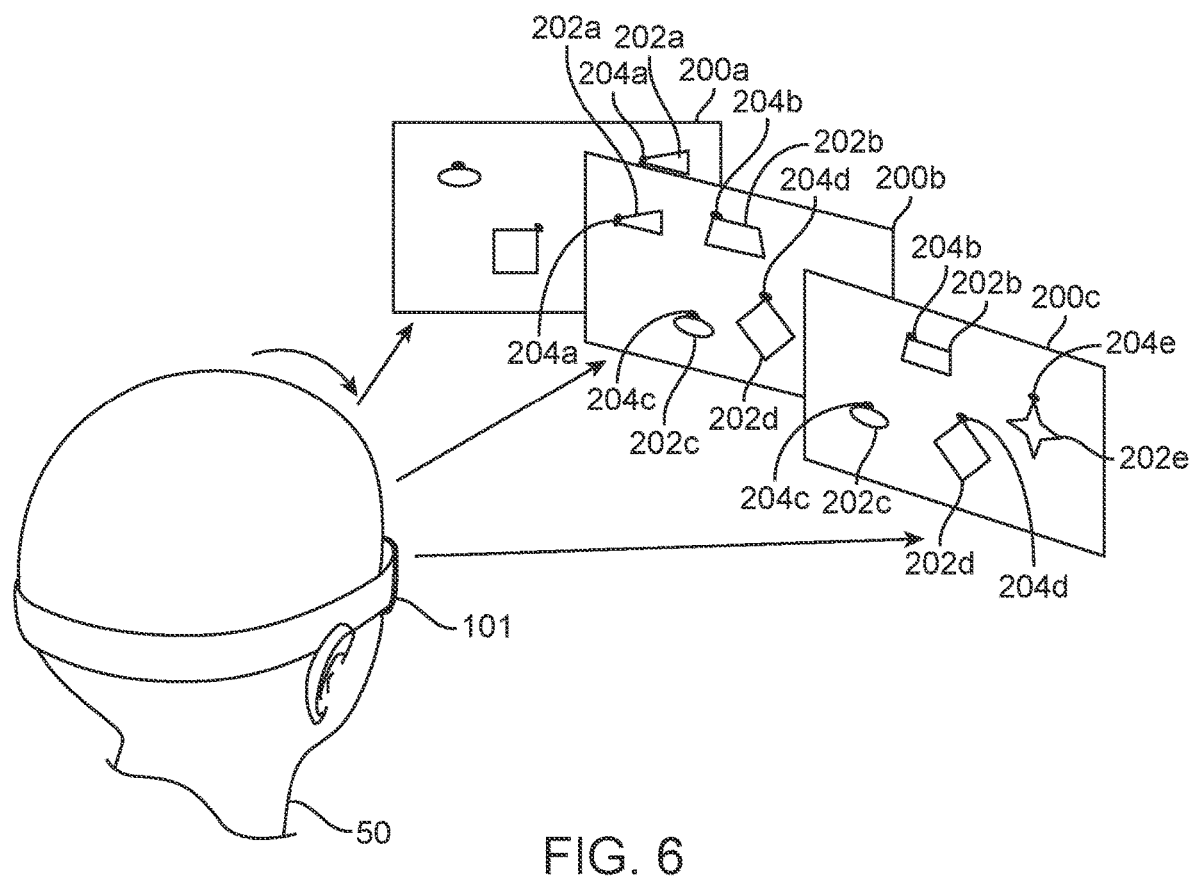
FIG. 6 illustrates a method for determining a map for allowing an image display device to localize a user of the image display device, and/or to perform other function(s).

FIG. 6 illustrates a method for determining a map for allowing the image display device 101 to localize the user 50 of the image display device 101. As shown in the figure, when the user 50 is using the image display device 101, the user 50 can move the image display device 101 to achieve different viewing locations and/or directions. For example, the user 50 may turn his/her head, turn his/her body, and/or walk to different locations. In some embodiments, the image display device 101 includes a forward facing camera. Thus, by moving the image display device 101, the field of view of the forward facing camera of the image display device 101 will change accordingly. While the user 50 is at different poses, the camera of the image display device 101 generates corresponding images. In the illustrated example, the user 50 achieves three different poses by turning his/her head, and the forward facing camera of the image display device 101 generates three images 200*a*-200*c* that correspond with the three poses. Each of the images 200*a*-200*c* captures certain objects 202 in the environment. For example, image 200*b* captures objects 202*a*-202*d*, and image 200*c* captures objects 202*b*-202*e*. Depending on the poses achieved by the user 50, a certain object in the environment may be captured in multiple images 202 of the camera, and certain other object may be captured in only one image 200. In some embodiments, the processing unit 130 of the image display device 101 is configured to obtain the images 200 from the camera of the image display device 101, and perform image processing to extract features from the images 200 to create a map 220. The map 200 may be stored in a non-transitory medium of the image display device 101, and may be used by the processing unit 130 to perform localization of the user 50. Thus, the map 220 functions as a localization map. In the illustrated embodiments, the map 220 is a three dimensional representation of the environment detected by the different poses of the user 50.

Figure 7:
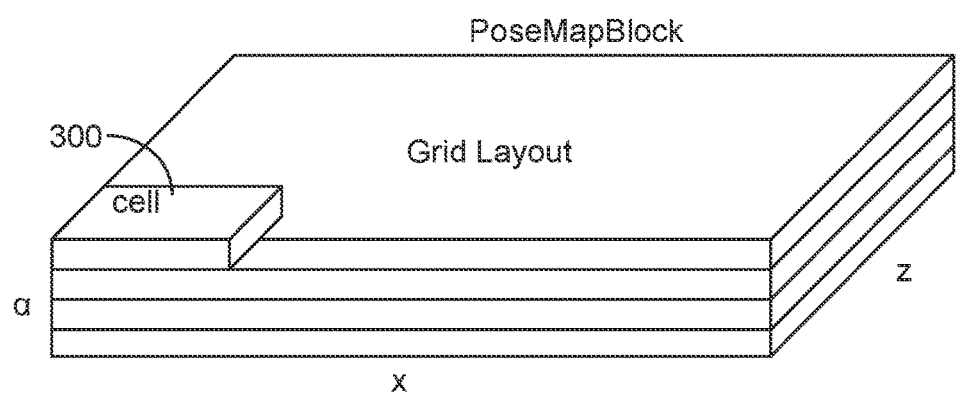
FIG. 7 illustrates an example of an environment being divided into multiple cells.

In some embodiments, the environment surrounding the user 50 may be divided into multiple cells. In such cases, the above map creation technique may be employed for the different cells of the environment. FIG. 7 illustrates an example of an environment being divided into multiple cells 300. Each cell 300 is a defined three-dimensional space representing a portion of the environment. Each cell 300 may have a pre-determined size and shape. For example, each cell 300 may have a footprint area that is 2 m×2 m, and a height that is 2 m. Each cell 300 may have other footprint dimensions and/or other heights in other embodiments. Also, in other embodiments, each cell 300 may not have a rectangular configuration shown, and may have other shapes. In the illustrated embodiments, the cells 300 all have the same shape and dimensions. In other embodiments, at least two of the cells 300 may have different respective dimensions and/or shapes.

In some embodiments, the user 50 of the image display device 101 may go to different locations in the environment corresponding to the different cells 300, and may scan the spaces in the corresponding cells using the camera of the image display device 101 to obtain different maps for the respective cells of the environment. The maps may be stored in the non-transitory medium of the image display device 101 for allowing the processing unit 130 of the image display device 101 to perform localization of the user 50.

During use of a map to localize the user 50, the camera of the image display device 101 obtains an image of the environment based on a certain position and orientation of the user 50. Such camera image serves as a tracking image (tracking map) for allowing the processing unit 130 of the image display device 101 to track a position of the user 50. In particular, the processing unit 130 of the image display device 101 processes the image from the camera to determine if features in the image match with certain features in the map 220. If a match is found, the processing unit 130 may then determine the position and orientation of the user 50 based on the matched features. In some embodiments, the map 220 may contain less information (e.g., features) than the tracking image provided by the camera of the image display device 101. This is advantageous because it allows the processing unit 130 to efficiently match the tracking image with the map 220. Also, in some embodiments, the map 220 may be called a "canonical map". When performing localization, the processing unit 130 performs features extraction to extra features from camera image (tracking image), and matches the features with those in the canonical map. In one implementation, the processing unit 130 is configured to find a six degree of freedom transformation between the tracking image and the canonical map to localize the user 50. Once the user 50 can be successfully localize with respect to his/her environment using the map, the processing unit 130 may then allow the user to place virtual content with respect to the environment using the map, retrieve the virtual content from previous session, share the virtual content with other user(s), etc.

During use of the image display device 101, the processing unit 130 may need to perform corner detection in images provided by the camera system of the image display device 101. For example, in some embodiments, when determining the map 220 using camera images, the processing unit 130 may need to detect corners in these images. The detected corners may be utilized by the processing unit 130 as features to construct the map 220. Also, when performing localization using the map 220, the processing unit 130 may need to match features in a real-time input image with features of the map 220. Accordingly, the processing unit 130 may be configured to detect corners in real-time input images. Corners are generally more stable features in the sense that corners are generally detectable from different viewing direction. Accordingly, the detectability of corners in images may not be significantly affected by change in view point. Therefore, corners are good features to match between input images and the map 220. Corners are also good features to use in stereo matching between images generated at different times and at different viewing directions.

Corner Detection

Figure 8:
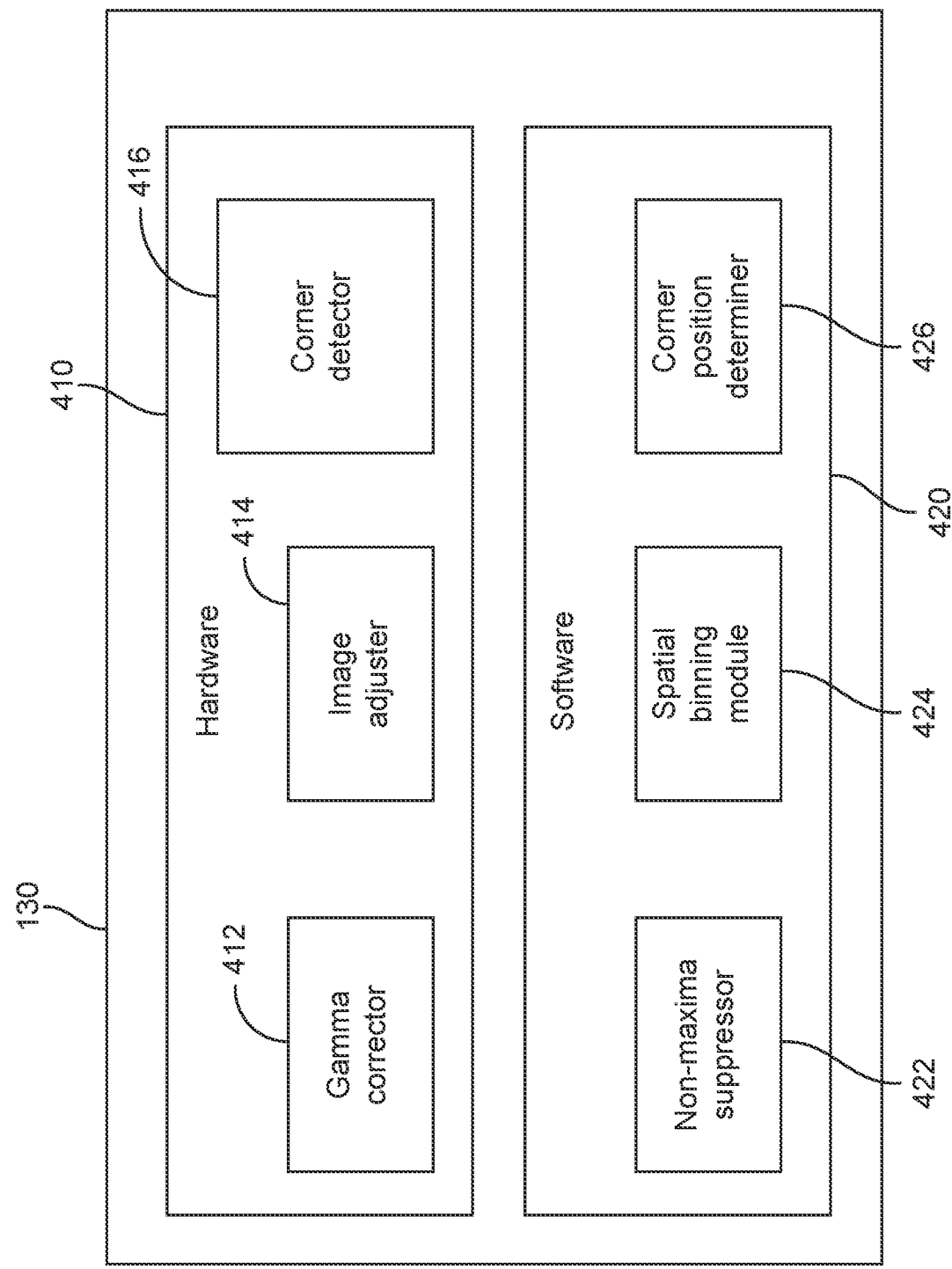
FIG. 8 illustrates a processing unit of an image display device.

FIG. 8 illustrates the processing unit 130, particularly showing components for implementing corner detection. As shown in the figure, the processing unit 130 includes hardware 410 and software 420. The processing unit 130 also includes a gamma corrector 412, an image adjuster 414, a corner detector 416, a non-maxima suppressor 422, a spatial binning module 424, and a corner position determiner 426. In the illustrated embodiments, the gamma corrector 412, the image adjuster 414, and the corner detector 416 are implemented using the hardware 410 of the processing unit 130. Also, in the illustrated embodiments, the non-maxima suppressor 422, the spatial binning module 424, and the corner position determiner 426 are implemented using the software 420 of the processing unit 130.

In other embodiments, the gamma corrector 412, the image adjuster 414, the corner detector 416, or any combination of the foregoing, may be implemented using the software 420 of the processing unit 130. Also, in other embodiments, the non-maxima suppressor 422, the spatial binning module 424, the corner position determiner 426, or any combination of the foregoing, may be implemented using the hardware 410 of the processing unit 130.

The gamma corrector 412 is configured to adjust a non-linear relationship between pixel value and luminance. For example, in some embodiments, the gamma corrector 412 may be configured to adjust a relationship between a pixel value and luminance so that their relationship is linear, or more linear compared to that in the original raw image.

The image adjuster 414 is configured to obtain an image, and downscale the resolution of the image to provide an adjusted image. In some embodiments, the image adjuster 414 is configured to obtain a first image that has a first resolution, and downscale the first image to obtain a second image with a second resolution that is less than the first resolution. For example, in some cases, the first image may have a VGA resolution, and the second image may have a QVGA resolution. In such cases, the second image has a number of pixels that is a quarter of that for the first image. In other examples, the second image may have a number of pixels that is other fractions of that for the first image.

The corner detector 416 is configured to detect corner(s) in an image based on one or more criteria. In some embodiments, the corner detector 426 is configured to detect corners in an image using Harris corner detection technique. Harris corner detection is achieved by calculating each pixel's gradient. If the absolute gradient values are both great (e.g., above a certain threshold(s)) in two directions (e.g., orthogonal directions), then the corner detector 416 may determine the pixel as a corner. In one implementation of the Harris corner detection technique, the following algorithm is employed to calculate a score for each pixel in an image:

(1) Compute x and y derivatives of image $$I_x = G_\sigma^x * I \quad I_y = G_\sigma^y * I$$

where $G^x$ and $G^y$ are the first-order directional differentials. In some cases, $G^x$ and $G^y$ may be calculated by convolving gray values and difference operators in direction x, y.

(2) Compute products of derivatives at every pixel $$I_{x2} = I_x \cdot I_x \quad I_{y2} = I_y \cdot I_y \quad I_{xy} = I_x \cdot I_y$$

(3) Compute the sums of the products of derivatives at each pixel $$S_{x2} = G_{\sigma t} * I_{x2} \quad S_{y2} = G_{\sigma t} * I_{y2} \quad S_{xy} = G_{\sigma t} * I_{xy}$$

(4) Define at each pixel (x, y) the matrix $$H(x, y) = \begin{bmatrix} S_{x2}(x, y) & S_{xy}(x, y) \\ S_{xy}(x, y) & S_{y2}(x, y) \end{bmatrix}$$

Alternatively, the matrix H may be represented as:

$$\begin{bmatrix} I_x^2 & I_x I_y \\ I_x I_y & I_y^2 \end{bmatrix}$$

where ($I_x$, $I_y$) is the gradient at (x, y).

(5) Compute the score (Harris response) for each pixel $$R = \text{Det}(H) - k(\text{Trace}(H))^2$$

where Det (H)=$\lambda_1 \lambda_2$, Trace (H)=$\lambda_1 + \lambda_2$, and $\lambda_1$ and $\lambda_2$ are eigenvalues of H.

Figure 9A:
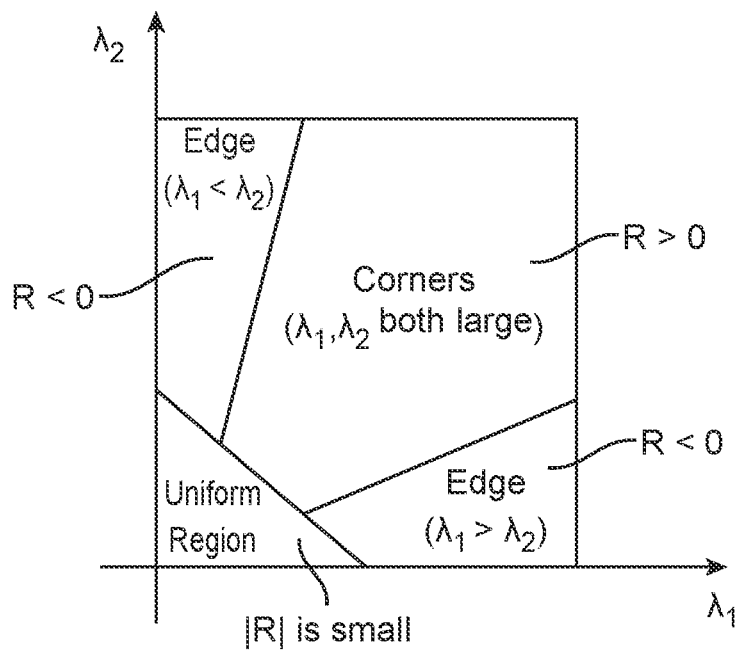
FIGS. 9A-9B illustrate classifications of image points using eigenvalues and/or Harris score.
Figure 9B:
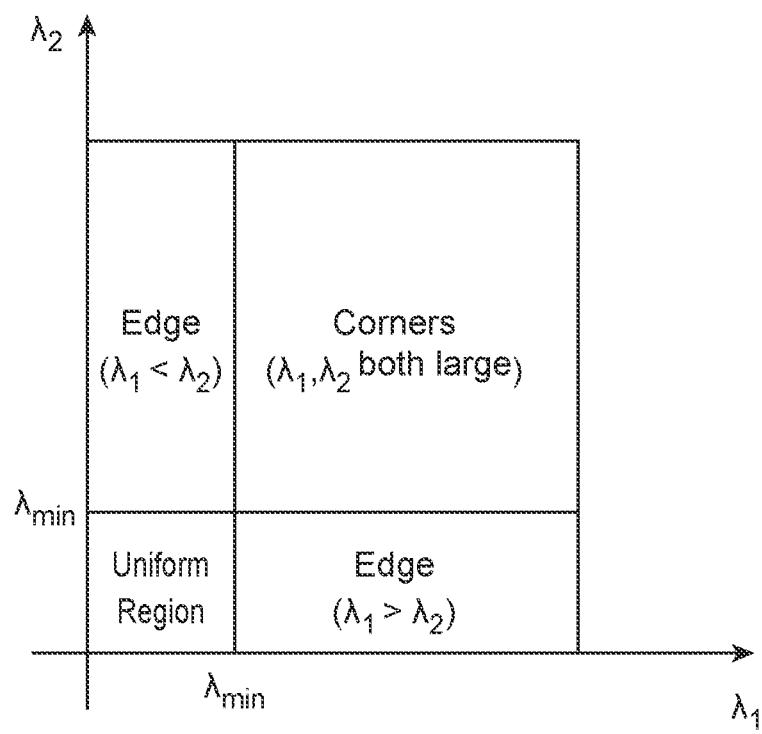

In some embodiments, the Harris response R and/or the eigenvalues $\lambda_1$, $\lambda_2$ may be used by the corner detector 416 in one or more criteria for corner detection. FIG. 9A shows classification of image points using response R and/or eigenvalues according to Harris scoring function. FIG. 9B shows classification of image points using eigenvalues according to Shi-Tomasi criteria. For example, as shown in FIGS. 9A-9B, if both eigenvalues $\lambda_1$, $\lambda_2$ are small, then the pixel may be a part of a flat region. Accordingly, the corner detector 416 may be configured to detect corner based at least in part on a criterion that min ($\lambda_1$, $\lambda_2$)>threshold. As another example, as shown in FIGS. 9A-9B, if the larger eigenvalue $\lambda_2$ is larger than the smaller eigenvalue $\lambda_1$ by a threshold, then the pixel may be a part of an object with a linear configuration (e.g., a line, edge, etc.). Accordingly, the corner detector 416 may be configured to detect corner based at least in part on a criterion that $\lambda_2/\lambda_1$<threshold. In some embodiments, the corner detector 416 may be configured to detect corners based on both criteria:

(1) min ($\lambda_1$, $\lambda_2$)>threshold T1

(2) $\lambda_2/\lambda_1$<threshold T2

In some embodiments, the threshold T1 may be set to be 300. In other embodiments, the threshold T1 may have other values different from 300. In some embodiments, the threshold T2 may be set to be 5. In other embodiments, the threshold T2 may have other values different from 5.

In other embodiments, the above two criteria may be expressed in terms of Det (H) and Trace (H), as follow:

Trace$(H)$>2$T1$, and Det $(H)$−$T1$*Trace$(H)$+$T1$^2>0

Det$(H)$−$T2$/((1+$T2$)^2)*Trace $(H)$^2>0

In such cases, the corner detector 416 may be configured to use two Harris responses of different k (k1, k2) to calculate Det and Trace, as follow:
 (1) Harris response based on k1>0 where k1=$T2$/((1+$T2$)^2)=0.139 when $T2$=5
 (2) Trace^2=(Harris response based on k2−Harris response based on k1)/(k1−k2)>4$T1$^2

In some embodiments, k2 may be selected in a manner that would simplify calculation. For example, the above equation (2) may be rewritten as:
 (2) (Harris response based on k2−Harris response based on k1)>(4$T1$^2)* (k1−k2)

In such cases, k2 may be selected so that the term on the right side ((4$T1$^2)* (k1−k2)) becomes 1, and the evaluation may be simplified based on the expression on the left side being greater than 1. In some embodiments, k2 may be calculated based on the formula:

$$K2=(k1-\tfrac{1}{16})/16$$

Accordingly, if k1 is set to be 0.139, k2 is then equal to 0.00478125 based on the above equation.

In should be noted that k1 and k2 are not limited to have the above values, and may have other values in other embodiments. For example, in other embodiments, k1 may have a value that is anywhere from 0.1 to 0.2. Also, for example, in other embodiments, k2 may have a value that is less than 0.001.

In addition, it should be noted that as used in this specification, the term "corner" is not limited to a point of intersection between two rectilinear lines, and may also refer to any point along a curve line that connects two lines (e.g., rectilinear lines), wherein the curve line may have a radius of curvature (such that, the smaller the radius of curvature, the sharper the "corner").

In some embodiments, the corner detector 416 may be configured to apply Harris corner detection one or more times on the first image to detect a set of corners in the first image based on one or more criteria. The corner detector 416 may also be configured to apply Harris corner detection one or more times on the second image to detect a set of corners in the second image based on one or more criteria. The one or more criteria may be selected so that only corners with certain desired features are detected.

Also, it should be noted that the corner detector 416 is not limited to detecting corners based on the above formulas and examples of values, and that the corner detector 416 may be configured to detect corners based on other formulas that may be derivation, variation, and/or modification of the above formulas. In addition, in other embodiments, the corner detector 416 may be configured to detect corners based on other corner detection techniques that are different from Harris corner detection technique.

The non-maxima suppressor 422 is configured to perform non-maxima suppression for detected corners, so that duplicate detection of the same corner is prevented. In some cases, due to the image resolution of the image and/or the manner in which corner detection is implemented, the same corner may be detected multiple times. For example, the corner detector 416 may detect the same corner three times at three locations that are close to each other, when in fact those three detected corners are all for the same corner in the image. Thus, as used in this specification, the term "corner" may refer to one corner, or instance(s) of a corner that is detected multiple times. In some embodiments, the non-maxima suppressor 422 may be configured to perform 3×3 non-maxima suppression. In such cases, if there are multiple corners detected within a 3×3 pixel region, the non-maxima suppressor 422 will select one of the multiple detected corners in this region as the detected corner. In one implementation, the non-maxima suppressor 422 may be configured to determine corner scores for the respective multiple detected corners within a region, and select the corner with the highest score as the detected corner for that region. The score may indicate a probability that the detected corner is at the detected location, or an accuracy of the position of the detected corner.

The spatial binning module 424 is configured to select certain ones of the detected corners for the given image so that different regions of the image will have a somewhat even distribution of detected corners. In particular, after the non-maxima suppressor 422 removes duplicate detected corners, there may still be a lot of detected corners for the given image, and/or the remaining detected corners may have different distributions in different regions of the image. The spatial binning module 424 is configured to select a subset of the detected corners so that different regions of the image will have a certain maximum number of detected corners that meet certain criteria. For example, in some embodiments, the second image may be divided into four regions. The four regions may have different respective numbers of detected corners, and respective scores, as follow:
 Region 1: (C1, 0.7), (C2, 0.8) (C3, 0.85) (C4, 0.9)
 Region 2: (C5, 0.6), (C6, 0.65)
 Region 3: (C7, 0.66), (C8, 0.82)
 Region 4: (C9, 0.9), (C10, 0.88), (C11, 0.63)

In the above example, region 1 has 3 detected corners C1-C4, region 2 has 2 detected corners C5-C6, region 3 has 2 detected corners C7-C8, and region 4 has 3 detected corners C9-C11. If the maximum number of corners desired for each region is selected to be 3, and if the criteria for selecting a corner is that the corner must have a score of 0.7 or higher, then the spatial binning module 424 may select the following corner(s) for the different respective regions 1-4:
 Region 1: C2, C3, C4 (note that corner C1 has the lowest score in region 1, and so the three corners with the highest score in the region 1 is selected; the spatial binning module 424 cannot select all 4 corners C1-C4 because the maximum number of corners is prescribed to be 3 in the example).
 Region 2: No corner selected (because both corners C5 and C6 have scores that do not meet the minimum score criteria).
 Region 3: Only corner C8 is selected (because corner C7 has score that does not meet the minimum score criteria).
 Region 4: Only corners C9 and C10 are selected (because corner C11 has score that does not meet the minimum score criteria).

The corner position determiner 426 is configured to determine the final positions of the respective detected corners. Because the corners were detected by the corner detector 416 based on an image with reduced resolution, it may be desirable to refine the positions of these detected corners based on a higher resolution image. As discussed, in some embodiments, the image adjuster 414 is configured to convert a first image with a first resolution to a second image with a second resolution. Also, as discussed, in some embodiments, the second resolution of the second image that is used to detect the corners is a quarter of the first resolution of the first image. Following this example, for every pixel in the second image that has been identified as a position of a detected corner, there are four corresponding pixels in the first image that correspond with the detected corner. Accordingly, the corner position determiner 426 may be configured to select one of four pixels in the first image (that corresponds with the pixel of the detected corner in the second image) as the detected corner.

In one implementation, the corner position determiner 426 is configured to select one pixel (from the four pixels in the first image) based on one or more corners detected in the first image. For example, the corner detector 416 may detect that there are two corners in the first image that are in close proximity with the coordinate (xr, yr) of the corner in the second image. For example, the coordinates of the two corners in the first image may be determined by the corner position determiner 426 as (x1, y1), (x2, y2). Next, the corner position determiner 426 then calculates the distances between the respective pixel coordinates of the corners in the first image and the pixel coordinate of the corner in the second image, as follow:

$$D1=((x1-xr)^2+(y1-yr)^2)^{1/2}$$

$$D2=((x2-xr)^2+(y2-yr)^2)^{1/2}$$

The corner position determiner 426 then selects the coordinate of the pixel in the first image that has the lowest corresponding distance D (i.e., min (D1, D2) as the position of the detected corner.

In other embodiments, the corner position determiner 426 may refine the position of the detected corner (detected from the second image) using other techniques. For example, in other embodiments, the positions of the set of corners (which are selected as a subset of detected corners in the second image by the non-maxima suppressor 422 and the spatial binning module 424) output by the spatial binning module 424 may be input to the corner detector 416. The corner detector 416 then executes corner detection algorithm to detect corners in the first image in discrete locations that correspond with the positions of the set of corners from the second image. In one implementation, the corner detector 416 may execute Harris corner detection algorithm to detect a set of corners in the first image that correspond in position with respect to those detected corners in the second image. This technique is advantageous in that the Harris corner detection is not required to be performed on the entire first image, but only on discrete portions of the first image, thereby saving time and computational resources.

In some embodiments, the gamma corrector 412, the image adjuster 414, and the corner detector 416 may be implemented using specialized hardware that is specifically designed to perform the functions of these components. By means of non-limiting examples, the hardware may include one or more FPGA processors, one or more ASIC processors, one or more signal processors, one or more math processors, one or more processors specifically designed to perform matrix operations, or any combination of the foregoing. Also, in some embodiments, the processing unit 130 may be implemented as separate components that are communicatively coupled together. For example, the processing unit 130 may have a first substrate carrying the gamma corrector 412 and the image adjuster 414, and another substrate carrying the corner detector 416. As another example, the processing unit 130 may have a processor for executing the software 420, wherein the processor may be implemented on a same substrate supporting the corner detector 416, or on a different substrate as that for the corner detector 416. In further embodiments, there may be separate substrates carrying the gamma corrector 412, the image adjuster 414, the corner detector 416, and the processor running the software 420, respectively. In addition, in some embodiments, any, some, or all of the components of the processing unit 130 may be implemented at the head-worn frame structure 102. In other embodiments, any, some, or all of the components of the processing unit 130 may be implemented at a device that is away from the head-worn frame structure 102, such as at a belt-clip module, a neck-worn module, a cell phone, etc.

Figure 10:
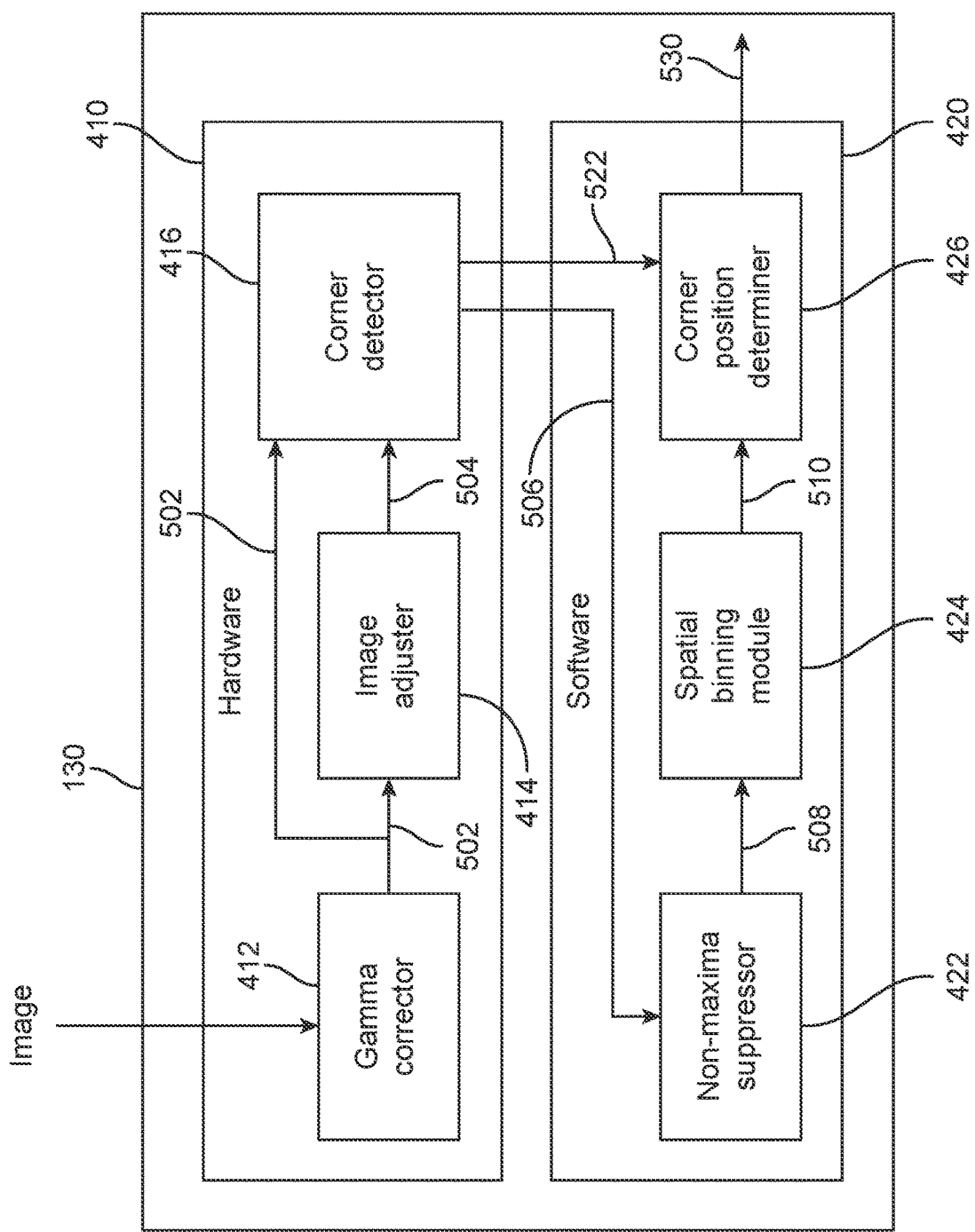
FIG. 10 illustrates a signal flow for the processing unit of FIG. 8.

FIG. 10 illustrates an example of signal flow among the various components of the processing unit 130 of FIG. 8. The signal flow will be described with reference to the graphical example shown in FIG. 11. As shown in FIG. 10, the processing unit 130 receives an image from camera system of the image display device 101. The image may be a real-time image, or an image that has a time lag. In other embodiments, the image may be received from a non-transitory medium that stores the image. The non-transitory medium may be a part of the image display device 101, or an external device, such as another image display device, a server, a cell phone, a media device, etc. The image is initially processed by the hardware 410 of the processing unit 130. In particular, the gamma corrector 412 of the processing unit 130 adjusts a nonlinear relationship between pixel value and luminance for the pixels in the image. For example, the gamma corrector 412 may adjust the relationship between the pixel value and luminance so that their relationship is linear, or more linear compared to that in the original raw image. After the image is adjusted for gamma correction, the gamma corrector then passes the image 502 to the image adjuster 414.

The image adjuster 414 is configured to obtain the image (first image) 502 with a first resolution, and adjust the image 502 to obtain a second image 504 with a second resolution that is lower than the first resolution. For example, in some embodiments, the first image 502 may have a VGA resolution, and the second image 504 may have a QVGA resolution. In such cases, the second image 504 has a quarter of the number of pixels in the first image 502. In other embodiments, the first image 502 may have a resolution that is different from VGA resolution, and the second image 504 may have a resolution that is different from QVGA resolution. After the second image 504 is obtained, the image adjuster 414 then passes the second image 504 to the corner detector 416. As shown in the example of FIG. 11, the second image 504 includes an image of an object 600 and some corners (e.g., corner 602).

The corner detector 416 detects corners in the second image 504 based on one or more criteria. In some embodiments, the corner detector 416 executes a Harris corner detection algorithm one or more times based on one or more criteria to detect a set of corners 610 in the second image 504. In other embodiments, the corner detector 416 may perform corner detection using other techniques and algorithms. The criteria may be selected so that only corners that meet a certain desired features are detected. As shown in FIG. 11, the detected set of corners includes detected corners 610a-610g. After the corner detector 416 detects the corners 610a-610g in the second image 504, the corner detector 416 then passes corner detection result 506 to the non-maxima suppressor 422. The corner detection result 506 may include identifiers of the set of the detected corners 610a-610g, and their respective coordinates. In some embodiments, the corner detection result 506 may also optionally include scores for the respective detected corners 610a-610g. The score may indicate a quality of the detected corner, a confidence level of the detected corner, an accuracy of the detected corner, etc.

Figure 11:
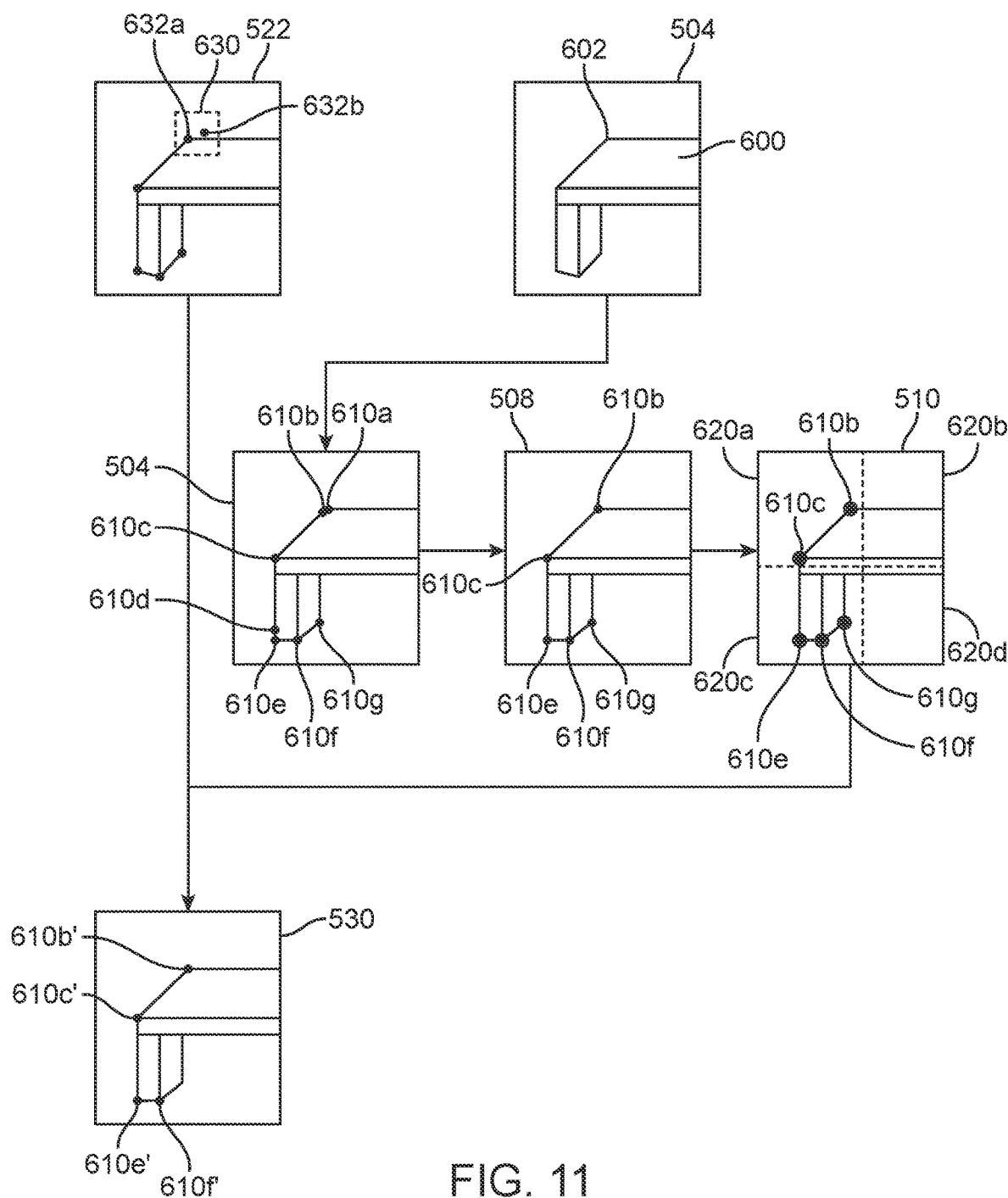
FIG. 11 illustrates an example of corner detection performed by the processing unit of FIG. 8.

As shown in the example of FIG. 11, the corner detector 416 detects the set of corners 610a-610g in the second image 504. However, some of the detected corners 610 may be different instances of detection that are for the same corner (e.g., corner 602) in the second image 504. For example, the corner detector 416 may detect two corners 610a, 610b that are close to each other, when in fact they are for the same corner 602 in the second image 504. Similarly, the corner detector 416 may detect two corners 610d, 610e that are close to each other, when in fact they are for the same corner in the second image 504. Accordingly, the non-maxima suppressor 422 is employed to perform non-maxima suppression for the detected corners 610, so that duplicate detection of the same corner is prevented. In some embodiments, the non-maxima suppressor 422 utilizes a 3×3 window to ensure that there is no duplicate detected corner within a grid of 3×3 pixels. In other embodiments, the non-maxima suppressor 422 may utilizes other window size to perform the non-maxima suppression. After the non-maxima suppressor 422 removes duplicate detected corners, the non-maxima suppressor 422 then passes the result 508 to the spatial binning module 424. In some embodiments, the result 508 is a subset of the result 506 output by the corner detector 416. As shown in the example of FIG. 11, the result 508 from the non-maxima suppressor 422 includes identifiers of corners 610b, 610c, and 610e-610g, while the corners 610a and 610d have been excluded as duplicate detected corners. The result 508 may include identifiers of a subset of the set of corners detected by the corner detector 416, and their respective coordinates. The result 508 from the non-maxima suppressor 422 may optionally also include scores for the respective detected corners. The score may indicate a quality of the detected corner, a confidence level of the detected corner, an accuracy of the detected corner, etc.

The spatial binning module 424 selects certain ones of the corners for the image 504 so that different regions of the image 504 will have a somewhat even distribution of detected corners. Following the above example of FIG. 11, the spatial binning module 424 receives five identified corners 610b, 610c, and 610e-610g from the non-maxima suppressor 422. The spatial binning module 424 then divides the image 504 into a prescribed number of regions. In the illustrated example, the spatial binning module 424 divides the image 504 into four regions 620a-620d. The first region 620a has two detected corners 610b, 610c, the second region 620b has zero detected corner, the third region 620c has three detected corners 610e-610g, and the fourth region 620d has zero detected corner. In the illustrated example, the spatial binning module 424 is configured to select a subset of the corners (determined by the non-maxima suppressor 422) in order to improve a distribution of the detected corners. For example, the spatial binning module 424 may be configured to select the subset of corners based on a maximum number of corners desired for each region and/or a minimum required score for each corner. If the desired maximum number of corners is selected to be 2 in the example, and if the minimum required score for each corner is set to 0.7, then the spatial binning module 424 may eliminate or exclude certain one(s) of the detected corners based on these criteria. In the illustrated example, assuming both detected corners 610b, 610c in the first region 620a have scores that are above 0.7, then the spatial binning module 424 will select both of these corners 610b, 610c in its output. In the second region 620b, there is no detected corner, and so the number of corners for this second region 620b is zero in the output of the spatial binning module 424. In the third region 620c, assuming the corner 610g has score that is below 0.7, and the corners 601e, 610f have scores that are above 0.7, the spatial binning module 424 accordingly selects corners 610e, 610f for inclusion in its output. Based on the foregoing, the spatial binning module 424 provides a subset of corners (as represented by the circles around the selected corners in FIG. 11) as its output 510. In some embodiments, the output 510 of the spatial binning module 424 may include identifiers of the subset of corners, and positions of the respective corners in the subset. The output 510 of the spatial binning module 424 may optionally also include scores for the respective corners, as similarly discussed. Thus, as can be seen from the illustrated example, the spatial binning module 424 is advantageous because it ensures that the detected corners are not concentrated in certain part of the image, and prevents too many detected corners for a certain part of the image.

As shown in the example, the detection of the corners by the corner detector 416, the non-maxima suppression by the non-maxima suppressor 422, and the spatial binning by the spatial binning module 424 are all performed based on the second image 504 with a reduced resolution. Accordingly, it may be desirable to refine the positions of the detected corners based on the resolution of the first image 502 in order to obtain a more accurate of the positions of the detected corners in the result 510 output by the spatial binning module 424. As shown in FIG. 10, the corner position determiner 426 is configured to refine the positions of the corners (selected by the spatial binning module 424), based on output 522 provided by the corner detector 416. In particular, as shown in the figure, the first image 502 with the first resolution is also processed by the corner detector 416 to obtain a set of corners. In some embodiments, the first image 502 may be processed by the corner detector 416 based on Harris corner detection technique. For example, one or more parameters utilized by the corner detector 416 to detect corners in the second image 504 may be used by the corner detector 416 to detect corners in the first image 502. In one implementation, the corner detector 416 uses a constant k3 to detect corner in the first image 502, wherein k3 may be equal to k1, or may have other values. In other embodiments, the corner detector 416 may use different parameters and/or criteria for detecting corners in the first image 502. In further embodiments, the corner detector 416 may use different corner detection techniques to detect corners in the first image 502. The corner position determiner 426 is configured to refine the positions of the detected corners in the set (result 510) based on the detected corners in the first image 502, in order to determine the final positions of the detected corners for the output 530. In some embodiments, the corner position determiner 426 is configured to determine which corner (in the output 522) detected based on the first image 502 has a best spatial correspondence with each of the corners in the set output by the spatial binning module 424 (i.e., in the output 510). For example, to improve the position of the detected corner 610b, if the corner 610b in the output 510 (based on the second image 504) has position (x=83, y=97), and if a corner in the output 522 (based on the first image 502) has position (x=84, y=95) that is the closest to the position of the corner 610b, then the corner position determiner 426 will use the position (x=84, y=95) as the final position for the detected corner 610b. In some embodiments, the corner position determiner 426 may be configured to examine only corners within a discrete region 630 of the first image 502 to identify a corner that corresponds with that in the output 510. As shown in FIG. 11, the region 630 may be a small window 630 around a position of a detected corner in the output 510. In the illustrated example, there are two corners 632a, 632b in the window 630 that are detected in the first image 502. The corner position determiner 426 determines which of these two corners 632a, 632b is closest in position with respect to the corner 610b in the output 510. In one implementation, the corner position determiner 426 may be configured to determine respective distances between positions of the corners 632a, 632b in the window 630 and the position of the corner 610b, and select the corner position for the corner 632 that provides the shortest distance from the position of the corner 610b. The above processing is repeated for other ones of the corners 610 in the output 510 in order to obtain a set of refined positions for the corners 610 in the output 510. As shown in the example of FIG. 11, the output 530 from the corner position determiner 426 includes the set of detected corners from the spatial binning module 424, but with improved positions for the corners (610b', 610c', 610e', and 610f').

As shown in the example, the detection of the corners by the corner detector 416, the non-maxima suppression by the non-maxima suppressor 422, and the spatial binning by the spatial binning module 424 are all performed based on the second image 504 with a reduced resolution. This technique is advantageous in that it allows these operations to be performed very quickly without significant computational resources. In the example in which the first image 502 has VGA resolution and the second image 504 has QVGA resolution, the processing unit 130 needs to process only a quarter of the pixels using the second image 504 (compared to the scenario in which the first image 502 is used) in all three stages of the processing by the corner detector 416, the non-maxima suppressor 422, and the spatial binning module 424. In some embodiments, such technique allows corner features to be extracted very quickly from an image. For example, using the above technique, a set of corners (after going through non-maxima suppression and spatial binning) may be obtained from an image in less than 10 ms, and more preferably in less than 6 ms (such as 5 ms or less). This is advantageous because it allows real-time processing of input camera images.

The above technique is also advantageous in that while the corner detection can be performed much faster (compared to the technique in which the entire image with original resolution is processed to detect corners), the corner detection is also as accurate as the technique in which the entire image with original resolution is processed. This is because only subsets of the first image (with higher resolution) are utilized to confirm locations of the corners detected using the second image with reduced resolution. Accordingly, the resulting detected corners have the same accuracy as the technique in which the entire first image is processed to detect corners.

Figure 12:
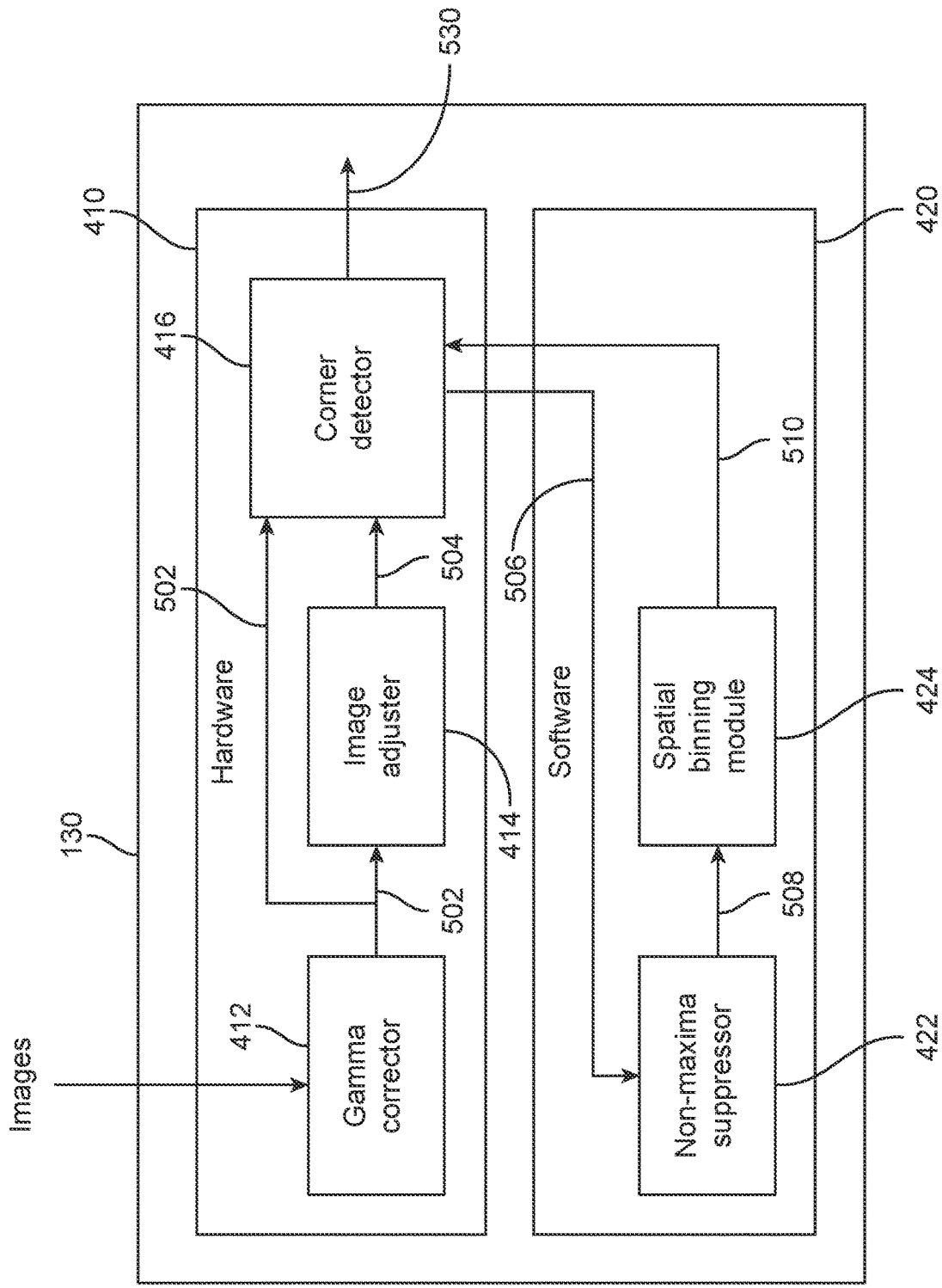
FIG. 12 illustrates a variation of the processing unit of FIG. 8.

In other embodiments, the corner position determiner 426 may refine the position of the detected corner (detected from the second image) using other techniques. For example, as shown in FIG. 12, in other embodiments, the output 510 by the spatial binning module 424 (e.g., positions of the set of corners selected as a subset of detected corners in the second image by the non-maxima suppressor 422 and the spatial binning module 424) may be input to the corner detector 416. The corner detector 416 then executes corner detection algorithm to detect corners in the first image in discrete locations that correspond with the positions of the set of corners from the second image. In one implementation, the corner detector 416 may execute Harris corner detection algorithm to detect a set of corners in the first image 502 that correspond in position with respect to those detected corners in the second image 504. This technique is advantageous in that the Harris corner detection is not required to be performed on the entire first image 502, but only on discrete portions of the first image 502, thereby further saving time and computational resources. In such cases, the corner detector 416 may provide the output 530, which includes a set of corners with refined positions for use as features/map points for the image.

In some embodiments, the detection of corners may be performed by the processing unit 130 to process real-time input images from the camera system of the image display device 101. For example, input image may be provided by the camera system, and the processing unit 130 determines a set of corners from the input image. The set of corners may be utilized as a set of features for the input image for matching with corresponding features with localization map in order to localize the user of the image display device 101.

In other embodiments, the detection of corners may be performed by the processing unit 130 to process images from the camera system of the image display device 101 in order to create a localization map. For example, the processing unit 130 may obtain a sequence of images from the camera system of the image display device 101, and may determine a set of corners from each of the images in the sequence. The images may be obtained by the camera system when the user of the image display device 101 is performing different head poses so that the images correspond with different viewing directions of the user. The processing unit 130 may also perform stereo matching in which it matches a corner in one image in the sequence with a corner in another image in the sequence, in order to create a 3D map point for that corner. The 3D map point is then included as a part of the localization map.

Figure 13:
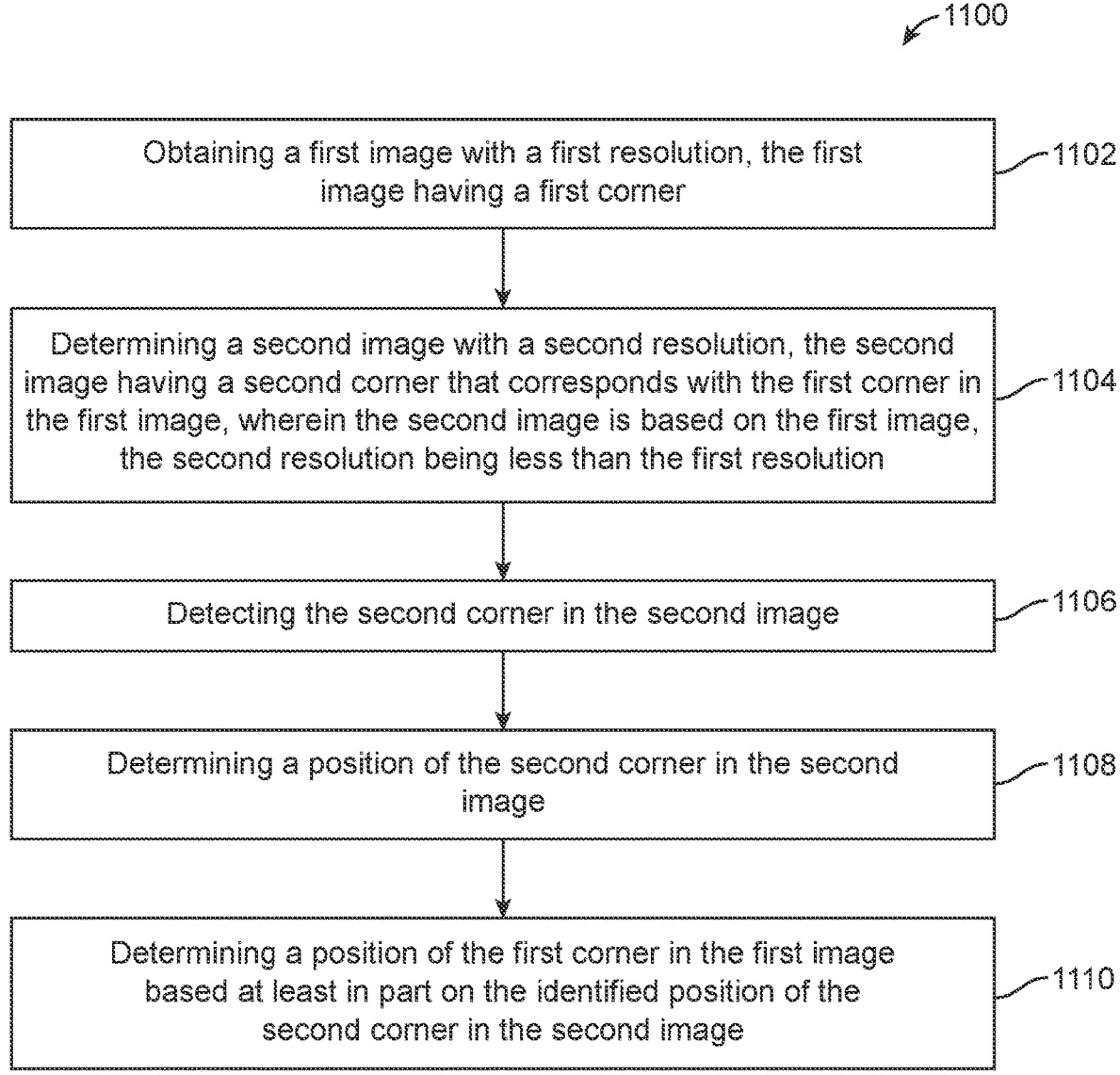
FIG. 13 illustrates a method performed by the processing unit of FIG. 8.

Method Performed by the Processing Unit and/or Application in the Processing Unit FIG. 13 illustrates a method 1100 in accordance with some embodiments. The method 1000 may be performed by an apparatus that is configured for head-worn by a user, the apparatus having a screen configured to present graphics for the user, a camera system configured to view an environment in which the user is located, and a processing unit. In some embodiments, the method 1100 may be performed by any of the image display devices 101 shown in FIGS. 1-4. For example, the method 1100 may be performed by the processing unit 130 of the image display device 101. The method 1100 includes: obtaining a first image with a first resolution, the first image having a first corner (item 1102). The method 1100 also includes determining a second image with a second resolution, the second image having a second corner that corresponds with the first corner in the first image, wherein the second image is based on the first image, the second resolution being less than the first resolution (item 1104). The method 1100 also includes detecting the second corner in the second image (item 1106), and determining a position of the second corner in the second image (item 1108). The method 1100 further includes determining a position of the first corner in the first image based at least in part on the determined position of the second corner in the second image (item 1110).

Optionally, in the method 1100, the second corner is a part of a set of corners in the second image that are detected.

Optionally, in the method 1100, the set of corners in the second image is detected based on a Harris corner detection technique.

Optionally, in the method 1100, the set of corners in the second image is detected based on one or more criteria.

Optionally, in the method 1100, the one or more criteria comprises a first criterion for excluding one or more objects in the second image that is planar and/or that has insufficient texture.

Optionally, in the method 1100, the one or more criteria comprises a second criterion for excluding one or more objects in the second image that is has a linear configuration.

Optionally, the method 1100 further includes performing non-maxima suppression to eliminate duplicate detected corners in the set of corners.

Optionally, in the method 1100, the non-maxima suppression comprises a 3×3 non-maxima suppression.

Optionally, the method 1100 is performed by a processing unit comprising hardware and software; wherein the set of corners is detected by the hardware of the processing unit; and wherein the non-maxima suppression is performed by the software of the processing unit.

Optionally, the method 1100 further includes performing spatial binning to select a subset of corners from the set of corners.

Optionally, the method 1100 further includes performing spatial binning by: dividing the second image into a plurality of image portions having a first image portion; determining a score for each of the corners in the set of corners; and selecting one or more corners from the corners in the first image portion based on the scores of the corners in the first image portion, and based on a prescribed maximum number of corners for the first image portion.

Optionally, the method 1100 is performed by a processing unit comprising hardware and software; wherein the set of corners is detected by the hardware of the processing unit; and wherein the spatial binning is performed by the software of the processing unit.

Optionally, in the method 1100, the second corner in the second image is detected by applying a Harris corner detection on the second image.

Optionally, the method 1100 further includes detecting the first corner in the first image by applying a Harris corner detection on the first image.

Optionally, the method 1100 further includes detecting a set of corners in the first image that includes the first corner.

Optionally, the method 1100 further includes identifying the first corner from the set of corners in the first image based at least in part on the position of the second corner in the second image.

Optionally, in the method 1100, the set of corners in the first image is detected by hardware, and the first corner is identified from the set of corners in the first image by software.

Optionally, in the method 1100, the position of the first corner is determined based on a relationship between the first resolution of the first image and the second resolution of the second image.

Optionally, in the method 1100, the position of the second corner corresponds with a pixel position (xr, yr) in the second image; wherein the pixel position (xr, yr) in the second image corresponds with a plurality of pixel positions in the first image; and wherein the position of the first corner is determined by selecting one of the plurality of pixel positions in the first image that has the best spatial relationship with respect to the pixel position (xr, yr) in the second image. For example, the best spatial relationship may be one in which the pixel position in the first image is the same as the pixel position in the second image. Alternatively, the best spatial relationship may be one in which the pixel position in the first image is within a prescribed distance (e.g., within 2 mm, 1 mm, 2-pixel length, 1-pixel length, etc.) from the pixel position in the second image.

Optionally, in the method 1100, the second image is determined by converting the first image to the second image.

Optionally, in the method 1100, the first image is converted to the second image by downscaling the first resolution of the first image to obtain the second image with the second resolution.

Optionally, in the method 1100, the second corner is a part of a set of corners in the second image that are detected, and wherein the position of the first corner in the first image is determined by software.

Optionally, the method 1100 is performed by a processing unit that comprises hardware.

Optionally, in the method 1100, the second corner in the second image is detected by the hardware of the processing unit.

Optionally, in the method 1100, the hardware of the processing unit is configured to execute a Harris corner detection algorithm.

Optionally, the method 1100 is performed by a processing unit comprising a corner detector, the corner detector configured to operate based on a first criterion.

Optionally, in the method 1100, the first criterion excludes an object in the second image that is planar and/or that has insufficient texture.

Optionally, in the method 1100, the first criterion comprises: $\lambda_{min} >$ a threshold, wherein $\lambda_{min} = \min(\lambda_2, \lambda_1)$, and wherein $\lambda_1$ is a first eigenvalue, $\lambda_2$ Is a second eigenvalue that is larger than the first eigenvalue.

Optionally, in the method 1100, the corner detector is configured to operate based also on a second criterion.

Optionally, in the method 1100, the second criterion excludes an object with a linear configuration in the second image.

Optionally, in the method 1100, the second criterion comprises: $\lambda_2/\lambda_1 <$ a threshold, wherein $\lambda_1$ is a first eigenvalue, $\lambda_2$ Is a second eigenvalue that is larger than the first eigenvalue.

Optionally, in the method 1100, the second corner in the second image is detected based on a first constant k1.

Optionally, in the method 1100, k1=R/(1+R)^2, where R is any number.

Optionally, in the method 1100, the first constant k1 is between 0.1 and 0.2.

Optionally, in the method 1100, the first constant k1 is 0.139.

Optionally, in the method 1100, the second corner in the second image is detected based on a second constant k2.

Optionally, in the method 1100, the second constant k2 is less than 0.01.

Optionally, in the method 1100, the second constant k2 is 0.00478125.

Optionally, in the method 1100, the second constant k2 is based on the first constant k1.

Optionally, in the method 1100, k2=(k1−1/16)/16.

Optionally, in the method 1100, the second corner in the second image is detected based on Det(H), wherein H is a matrix.

Optionally, in the method 1100, the second corner in the second image is detected based on trace(H), wherein H is a matrix.

Optionally, in the method 1100, the second corner is detected by performing a first Harris corner detection based on a first constant and a second constant, wherein the second constant is different from the first constant.

Optionally, in the method 1100, the second constant is based on the first constant.

Optionally, the method 1100 further includes performing non-maxima suppression.

Optionally, the method 1100 further includes performing spatial binning.

Optionally, the method 1100 is performed by a processing unit that comprises software.

Optionally, the method 1100 further includes performing non-maxima suppression by the software of the processing unit.

Optionally, the method 1100 further includes performing spatial binning by the software of the processing unit.

Optionally, in the method 1100, the first resolution comprises a VGA resolution.

Optionally, in the method 1100, the second resolution comprises a QVGA resolution.

Optionally, the method 1100 further includes storing the position of the first corner in a non-transitory medium.

Optionally, the method 1100 further includes creating a map based at least in part on the position of the first corner.

Optionally, in the method 1100, the map comprises a map point associated with the position of the first corner.

Optionally, the method 1100 further includes performing localization of a user of the image display device based on the created map.

Optionally, the method 1100 further includes performing a matching between the first image and a map based at least in part on the position of the first corner in the first image.

Specialized Processing System

In some embodiments, the method 1100 described herein may be performed by the processing unit 130 executing an application, or by the application. The application may contain a set of instruction. In one implementation, a specialized processing system having a non-transitory medium storing the set of instruction for the application may be provided. The execution of the instruction by the processing unit 130 of the image display device 101 will cause the processing unit 130 to perform the features described herein.

In some embodiments, the image display device 101 may also be considered as a specialized processing system. In particular, the image display device 101 is a specialized processing system in that it contains instruction stored in its non-transitory medium for execution by the processing unit 130 to provide unique tangible effects in a real world. The features provided by the image display device 101 (as a result of the processing unit 130 executing the instruction) provide improvements in the technological field of corner detection, localization map creation, and image-based localization.

Figure 14:
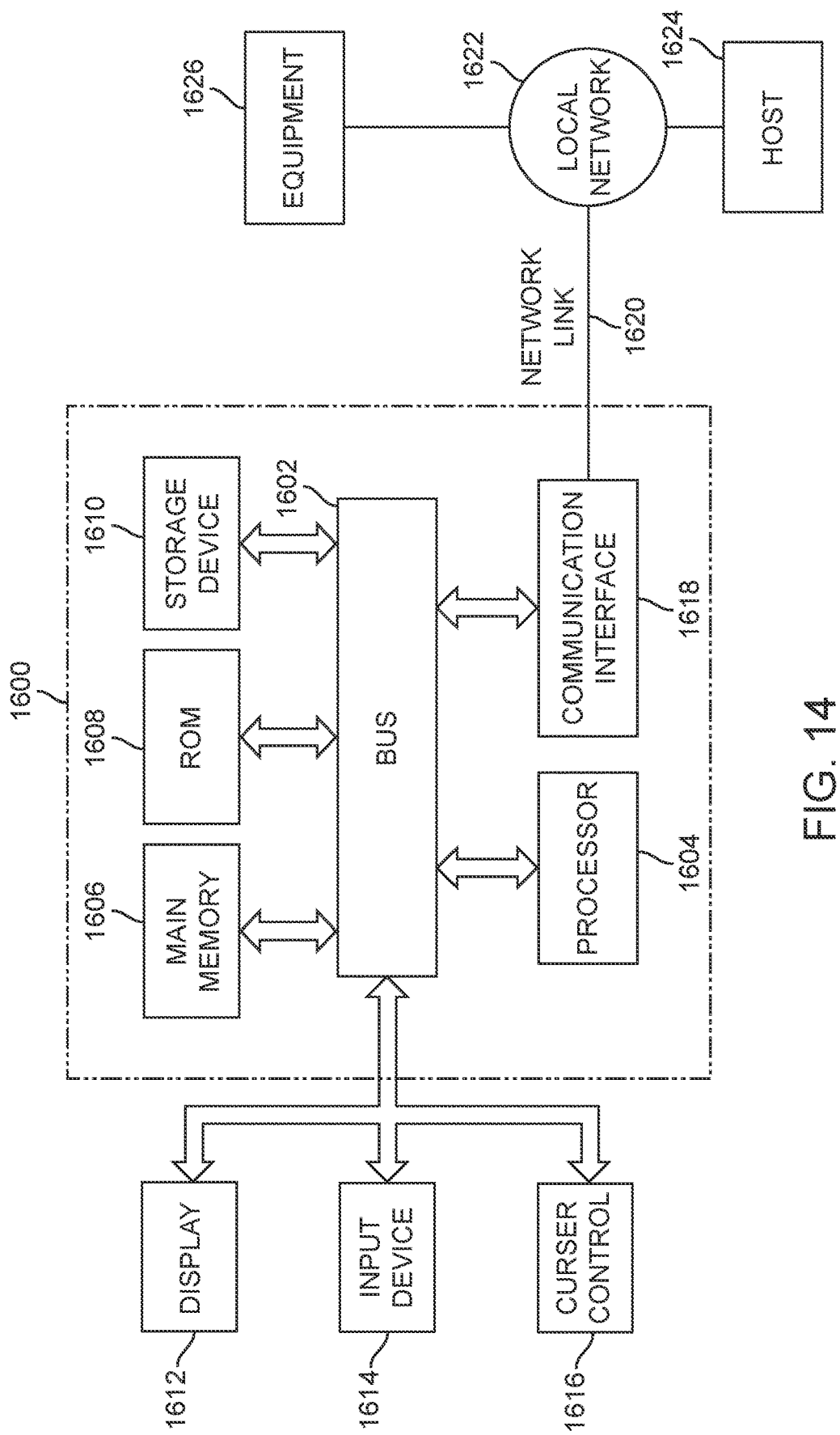
FIG. 14 illustrates a specialized processing system in accordance with some embodiments.

FIG. 14 is a block diagram illustrating an embodiment of a specialized processing system 1600 that can be used to implement various features described herein. For example, in some embodiments, the processing system 1600 may be used to implement the image display device 101. Also, in some embodiments, the processing system 1600 may be used to implement the processing unit 130, or one or more components therein (e.g., the gamma corrector 412, the image adjuster 414, the corner detector 416, etc.).

The processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk, solid state disk, or optical disk, is provided and coupled to the bus 1602 for storing information and instructions.

The processor system 1600 may be coupled via the bus 1602 to a display 1612, such as a screen, for displaying information to a user. In some cases, if the processing system 1600 is part of the apparatus that includes a touch-screen, the display 1612 may be the touch-screen. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. In some cases, if the processing system 1600 is part of the apparatus that includes a touch-screen, the input device 1614 and the curser control may be the touch-screen.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical, solid state or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a flexible disk, hard disk, magnetic tape, or any other magnetic medium, a CD-ROM, any other optical medium, any other physical medium with patterns of holes, a RAM, a PROM, and EPROM, a FLASH-EPROM, solid state disks any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk or solid state disk of a remote computer. The remote computer can load the instructions into its dynamic memory and send the instructions over a network, such as the Internet. The processing system 1600 can receive the data on a network line. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

It should be noted that the term "image", as used in this specification, may refer to image that is displayed, and/or image that is not in displayed form (e.g., image that is stored in a medium, or that is being processed).

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. It is further noted that any claim may be drafted to exclude any optional element. As such, this statement is intended to serve as antecedent basis for use of such exclusive terminology as "solely," "only" and the like in connection with the recitation of claim elements, or use of a "negative" limitation.

In addition, as used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. An apparatus configured for head-worn by a user, comprising:
   a screen configured to present graphics for the user;
   a camera system configured to view an environment in which the user is located; and
   a processing unit coupled to the camera system, the processing unit configured to:
   obtain an image having a corner, and
   detect corner in the image based on a constant k1, wherein $k1=R/(1+R)^2$, where R is a number different from −1, and wherein a value of k1 is determined by selecting a number for R, and calculating k1 based on the above equation.

2. The apparatus of claim 1, wherein the processing unit is configured to remove one or more duplicate detected corners in a set of corners detected from the image, the set of corners comprising the corner, before detecting the corner in the image.

3. The apparatus of claim 2, wherein the processing unit is configured to detect the set of corners in the image based on one or more criteria; and
   wherein the one or more criteria comprises a first criterion for excluding one or more objects in the image that is planar and/or that has insufficient texture, a second criterion for excluding one or more objects in the image that has a linear configuration, or both the first criterion and the second criterion.

4. The apparatus of claim 2, wherein the processing unit is configured to perform spatial binning to select a subset of corners from the set of corners.

5. The apparatus of claim 4, wherein the processing unit comprises hardware and software;
   wherein the hardware of the processing unit is configured to detect the set of corners; and
   wherein the software of the processing unit is configured to perform the spatial binning.

6. The apparatus of claim 2, wherein the processing unit is configured to perform spatial binning by:
   dividing the image into a plurality of image portions having a first image portion;
   determining a score for each of the corners in the set of corners; and
   selecting one or more corners from the corners in the first image portion based on the scores of the corners in the first image portion, and based on a prescribed maximum number of corners for the first image portion.

7. The apparatus of claim 2, wherein the processing unit is configured to perform non-maxima suppression.

8. The apparatus of claim 7, wherein the processing unit comprises hardware and software;
   wherein the hardware of the processing unit is configured to detect the set of corners; and
   wherein the software of the processing unit is configured to perform the non-maxima suppression.

9. The apparatus of claim 1, wherein the processing unit is configured to detect a set of corners in the image that includes the corner; and
   wherein the processing unit is also configured to detect the corner from the set of corners in the image.

10. The apparatus of claim 9, wherein the processing unit comprises hardware configured to detect the set of corners in the image, and software configured to detect the corner from the set of corners in the image.

11. The apparatus of claim 1, wherein the processing unit comprises a corner detector configured to operate based on a first criterion; and
    wherein the first criterion excludes an object in the image that is planar and/or that has insufficient texture.

12. The apparatus of claim 11, wherein the corner detector is further configured to operate based on a second criterion; and
    wherein the second criterion excludes an object with a linear configuration in the image.

13. The apparatus of claim 1, wherein the processing unit is configured to detect a second corner in the image based on a second constant k2.

14. The apparatus of claim 13, wherein the second constant k2 is based on the constant k1.

15. The apparatus of claim 14, wherein $k2=(k1-\frac{1}{16})/16$, and wherein a value of k2 is determined by obtaining a value for k1, and calculating k2 based on the above equation.

16. The apparatus of claim 1, wherein the processing unit is configured to perform at least one of non-maxima suppression or spatial binning.

17. The apparatus of claim 16, wherein the processing unit comprises software configured to perform the at least one of non-maxima suppression or spatial binning.

18. The apparatus of claim 1, wherein the processing unit is configured to:
    determine a position of the corner detected in the image; and
    create a map based at least in part on the position of the corner; and
    perform localization of the user based on the created map.

19. An apparatus configured for head-worn by a user, comprising:
    a screen configured to present graphics for the user;
    a camera system configured to view an environment in which the user is located; and
    a processing unit coupled to the camera system, the processing unit configured to:
       obtain an image having a corner,
       determine a position of the corner in the image,
       remove one or more duplicate detected corners in a set of corners detected from the image, the set of corners comprising the corner, and
       remove a non-duplicate detected corner in the set of corners detected from the image based on corner scores and based on a prescribed maximum number of corners for an image portion that is geometrically smaller than the image.

20. A method performed by a head-worn image display device, comprising:
    obtaining an image having a corner;
    determining a position of the corner in the image;
    removing one or more duplicate detected corners in a set of corners detected from the image, the set of corners comprising the corner; and
    removing a non-duplicate detected corner in the set of corners detected from the image based on corner scores and based on a prescribed maximum number of corners for an image portion that is geometrically smaller than the image.

* * * * *